(12) United States Patent
Asija et al.

(10) Patent No.: US 12,287,814 B2
(45) Date of Patent: Apr. 29, 2025

(54) NATURAL LANGUAGE BASED DATA LINEAGE TRACKING IN COMPLEX DATA ECOSYSTEMS

(71) Applicant: Optum, Inc., Minnetonka, MN (US)

(72) Inventors: Jeetu Asija, Minneapolis, MN (US); Jaiprabhu Vijaya Rangan, Brampton (CA)

(73) Assignee: OPTUM, INC., Minnetonka, MN (US)

( * ) Notice: Subject to any disclaimer, the term of this patent is extended or adjusted under 35 U.S.C. 154(b) by 0 days.

(21) Appl. No.: 18/360,932

(22) Filed: Jul. 28, 2023

(65) Prior Publication Data

US 2025/0036660 A1    Jan. 30, 2025

(51) Int. Cl.
*G06F 16/20* (2019.01)
*G06F 16/28* (2019.01)

(52) U.S. Cl.
CPC .......... *G06F 16/288* (2019.01); *G06F 16/282* (2019.01)

(58) Field of Classification Search
CPC ............................ G06F 16/288; G06F 16/282
See application file for complete search history.

(56) References Cited

U.S. PATENT DOCUMENTS

| | | |
|---|---|---|
| 10,445,170 B1 | 10/2019 | Subramanian et al. |
| 11,379,537 B2 * | 7/2022 | Chatelain ................ G06F 7/02 |
| 2012/0173747 A1 | 7/2012 | Roesch et al. |
| 2017/0140016 A1 | 5/2017 | Bartlett et al. |
| 2018/0052878 A1 | 2/2018 | Seetharaman et al. |
| 2018/0096077 A1 * | 4/2018 | Srivastava ........... G06F 16/2457 |
| 2018/0181630 A1 | 6/2018 | He et al. |
| 2019/0155826 A1 | 5/2019 | Vasisht et al. |
| 2021/0124755 A1 | 4/2021 | Vankamamidi et al. |
| 2021/0133605 A1 * | 5/2021 | Greene ................ G06F 16/2379 |
| 2021/0216229 A1 | 7/2021 | Bastide et al. |
| 2021/0216521 A1 | 7/2021 | Jia et al. |
| 2022/0179979 A1 | 6/2022 | Goswami et al. |
| 2022/0269884 A1 | 8/2022 | Walters et al. |

OTHER PUBLICATIONS

Rappeport, et al., "Detecting Chaos in Lineage-Trees: A Deep Learning Approach", Physical Review Research, vol. 4, (12 pages), Mar. 23, 2022, DOI: 10.1103/PhysRevResearch.4.013223.
Shvaiko, et al., "Ontology Matching", Proceedings of the ISWC Workshop, 253 pages, Dec. 2020, http://om2020.ontologymatching.org.

* cited by examiner

*Primary Examiner* — Kristopher Andersen
(74) *Attorney, Agent, or Firm* — Alston & Bird LLP

(57) ABSTRACT

Various embodiments of the present disclosure provide multi-stage data lineage tracking techniques for automatically generating holistic and accurate data catalog for complex data ecosystems. The techniques may include generating a critical attribute collection for a data-related task based on one or more natural language descriptions for the data-related task. The techniques include receiving a data lineage map that defines a plurality of hierarchical data layers for a data ecosystem associated with the data-related task. The techniques include generating a critical attribute map for the data-related task by identifying a data element for a critical attribute at each of the plurality of hierarchical data layers of the data lineage map. The techniques include identifying noncritical attributes for the data related task generating a task attribute map for the data-related task based on the noncritical attributes and the critical attribute map.

20 Claims, 11 Drawing Sheets

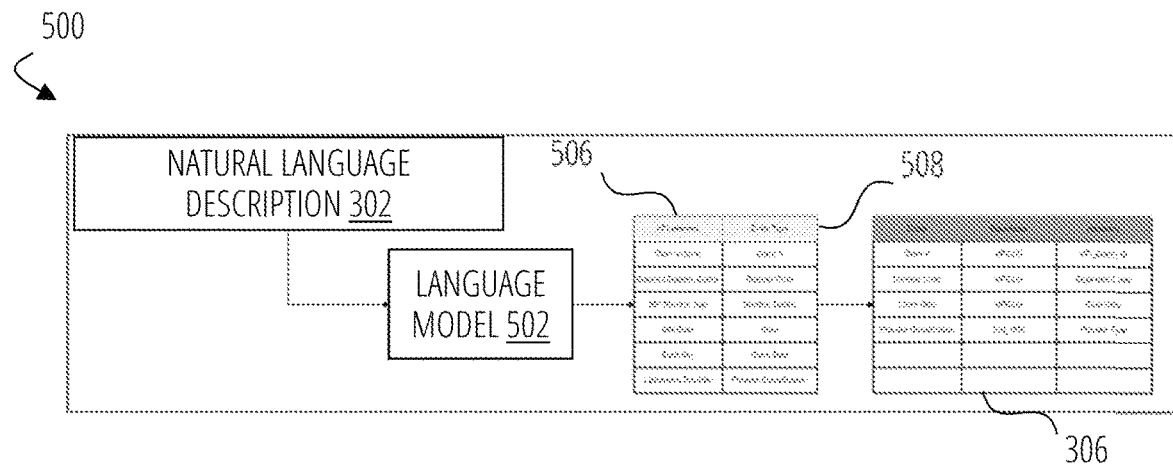
FIG. 5A
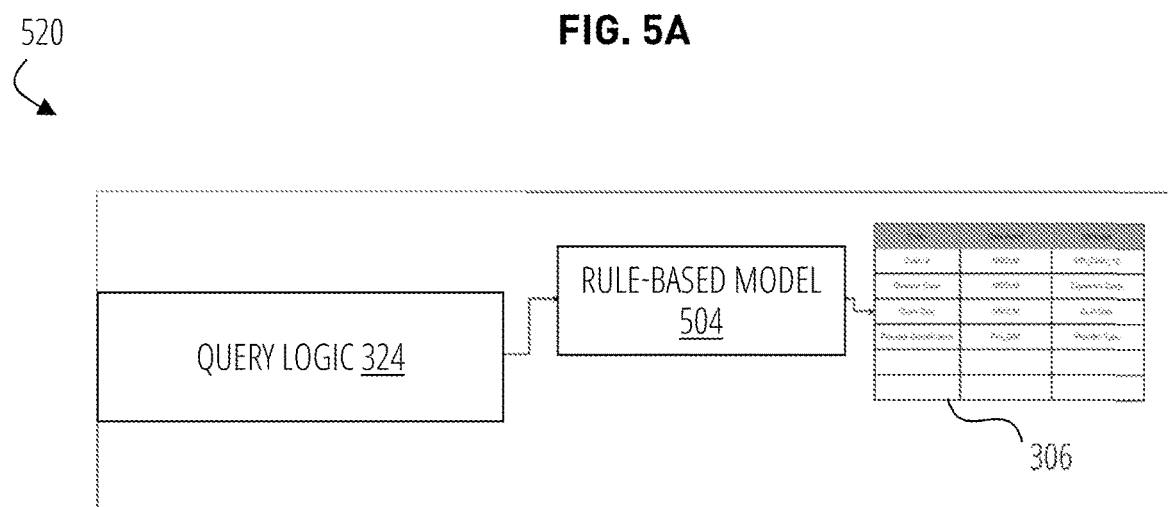
FIG. 5B
FIG. 5C

NATURAL LANGUAGE BASED DATA LINEAGE TRACKING IN COMPLEX DATA ECOSYSTEMS

BACKGROUND

Various embodiments of the present disclosure address technical challenges related to data lineage tracking given limitations of existing data cataloging techniques. Traditionally, data ecosystems in which data elements are transformed, modified, and/or sourced from a plurality of different data sources may rely on data catalogs with incomplete metadata from originating sources of data to various consumption points at which the data is accessed. This reduces the discoverability and reusability of data assets within a complex data ecosystem and results in duplicated data elements, inefficient data usage, and incomplete data governance. Traditional techniques for mapping relationships between data sources typically rely on manual interventions from a plurality of different subject matter experts, with no single user having a complete view of the end-to-end data flow. This leads to disjointed data lineages that are limited by the viewpoint of the user. Manual interventions may be improved by automated solutions tailored to particular downstream data consumers; however, such solutions fail to account for downstream consumers further down the chain. For instance, metadata management tools may be integrated with a data ecosystem, but they are limited to the technical metadata of particular data sources and fail to recognize complete data lineages across hierarchical layers of data sources. Various embodiments of the present disclosure make important contributions to various existing data cataloging approaches by addressing these technical challenges.

BRIEF SUMMARY

Various embodiments of the present disclosure disclose data lineage mapping techniques for improved data mapping, monitoring, and alerting using natural language text associated with different data elements across a data ecosystem. Traditional data cataloging techniques fail to recognize complete data lineages across hierarchical layers of data sources in a complex data ecosystem. Some of the techniques of the present disclosure address these technical disadvantages by providing improved multi-stage data lineage mapping techniques for iteratively generating a holistic task attribute map that defines end-to-end source-target relationships for data entities between each hierarchical data layer of a complex data ecosystem. By leveraging new machine learning and data processing techniques in accordance with some embodiments of the present disclosure, a holistic task attribute map may be generated automatically without compromising data accuracy. For instance, natural language descriptions descriptive of the goals of an enterprise may be leveraged to identify a subset of critical attributes within a complex data ecosystem. These attributes may be iteratively mapped, using some of the techniques of the present disclosure, across each of a number of hierarchical data layers of a complex data ecosystem to generate a critical attribute map for the complex data ecosystem. Insights from the critical attribute map may be leveraged to generate a holistic task attribute map that is grounded and informed by insights for frequently used data entities. By doing so, the multi-stage techniques of the present disclosure may improve the accuracy of automatic data lineage tracking across comprehensive sets of data elements by first focusing lineage tracking on data entities with robust sets of metadata. As described herein, some of the techniques of the present disclosure may be practically applied to improve data cataloging for complex data ecosystems, which may improve interactions, such as query handling, data governance, and/or the like, with data management systems and metadata management tools.

In some embodiments, a computer-implemented method includes generating, by one or more processors and using an attribute selection model, a critical attribute collection for a data-related task based on one or more natural language descriptions for the data-related task; receiving, by the one or more processors, a data lineage map that defines a plurality of hierarchical data layers for a data ecosystem associated with the data-related task; generating, by the one or more processors, a critical attribute map for the data-related task by identifying a data element for a critical attribute from the critical attribute collection at each of the plurality of hierarchical data layers of the data lineage map; identifying, by the one or more processors, a plurality of noncritical attributes for the data-related task based on the critical attribute collection; and generating, by the one or more processors, a task attribute map for the data-related task based on the plurality of noncritical attributes and the critical attribute map.

In some embodiments, a computing system includes memory and one or more processors communicatively coupled to the memory that are configured to generate, using an attribute selection model, a critical attribute collection for a data-related task based on one or more natural language descriptions for the data-related task; receive a data lineage map that defines a plurality of hierarchical data layers for a data ecosystem associated with the data-related task; generate a critical attribute map for the data-related task by identifying a data element for a critical attribute from the critical attribute collection at each of the plurality of hierarchical data layers of the data lineage map; identify a plurality of noncritical attributes for the data-related task based on the critical attribute collection; and generate a task attribute map for the data-related task based on the plurality of noncritical attributes and the critical attribute map.

In some embodiments, one or more non-transitory computer-readable storage media include instructions that, when executed by one or more processors, cause the one or more processors to generate, using an attribute selection model, a critical attribute collection for a data-related task based on one or more natural language descriptions for the data-related task; receive a data lineage map that defines a plurality of hierarchical data layers for a data ecosystem associated with the data-related task; generate a critical attribute map for the data-related task by identifying a data element for a critical attribute from the critical attribute collection at each of the plurality of hierarchical data layers of the data lineage map; identify a plurality of noncritical attributes for the data-related task based on the critical attribute collection; and generate a task attribute map for the data-related task based on the plurality of noncritical attributes and the critical attribute map.

BRIEF DESCRIPTION OF DRAWINGS

FIG. 5A is an operational example of a language model output in accordance with some embodiments discussed herein.

FIG. 5B is an operational example of a rule-based model output in accordance with some embodiments discussed herein.

FIG. 5C is an operational example of an aggregation model output in accordance with some embodiments discussed herein.

DETAILED DESCRIPTION

Figure 1:
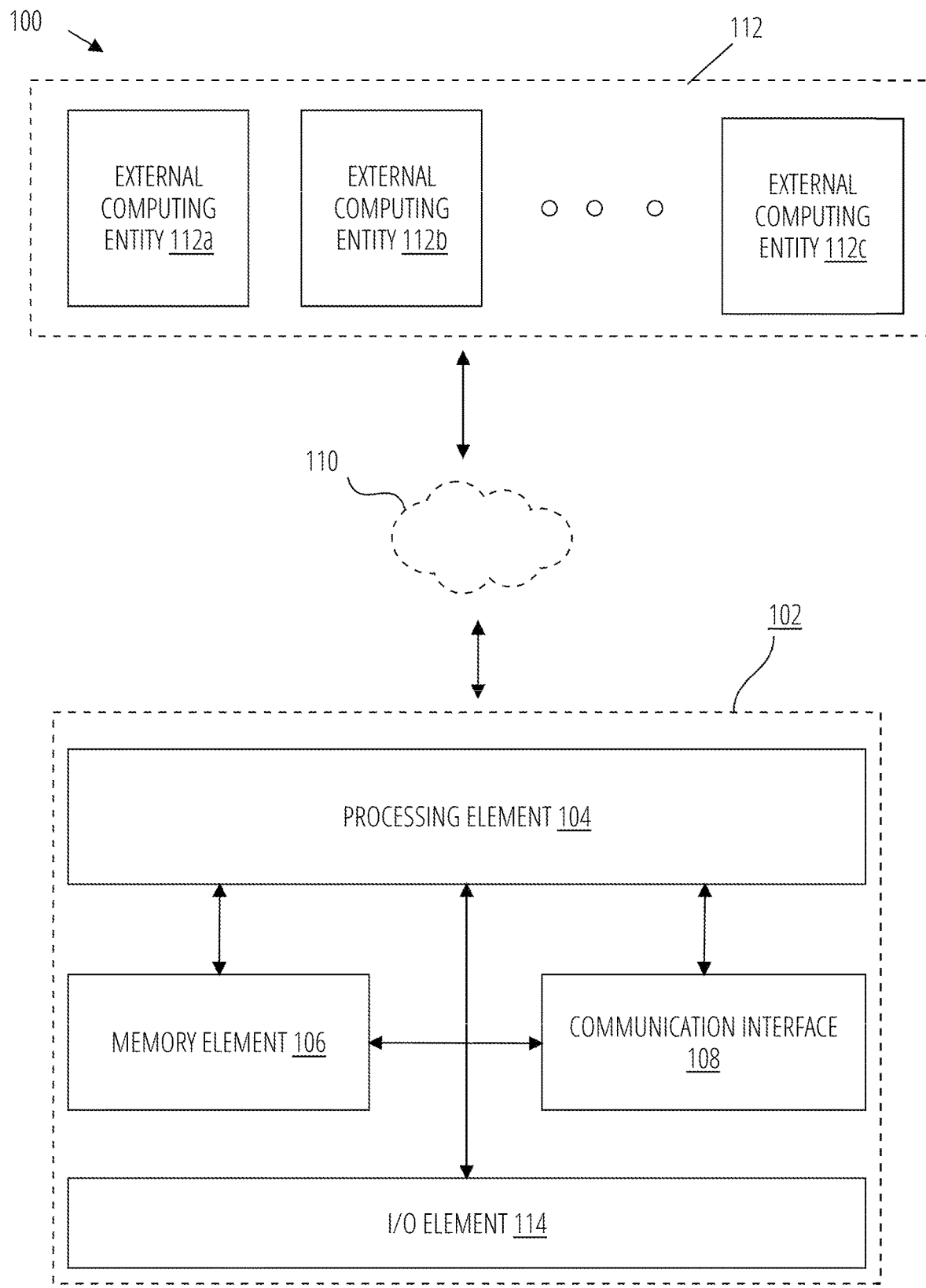
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., data lineage techniques, natural language processing techniques, data cataloging techniques, multi-stage data lineage mapping techniques, and/or the like) described herein.

The external computing entities 112a-c, for example, may include and/or be associated with one or more data sources configured to receive, store, manage, and/or facilitate one or more data sources of a complex data ecosystem. The external computing entities 112a-c, for example, may provide the access to the data to the predictive computing entity 102 through a plurality of different data sources and/or layers thereof. By way of example, the predictive computing entity 102 may include a query platform that is configured to leverage data from the external computing entities 112a-c and/or one or more other data sources to develop, maintain, and/or execute an automated data cataloging and querying system. In some examples, the operations of the predictive computing entity 102 may leverage one or more natural language descriptions, metadata, and/or the like provided by one or more of the external computing entities 112a-c to generate a task attribute map for cataloging end-to-end data lineages across complex data ecosystems. The external computing entities 112a-c, for example, may be associated with one or more data repositories, cloud platforms, compute nodes, organizations, and/or the like, that may be individually and/or collectively leveraged by the predictive computing entity 102 to obtain and aggregate natural language descriptions, metadata, and/or any other lineage information regarding various entities.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like, may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
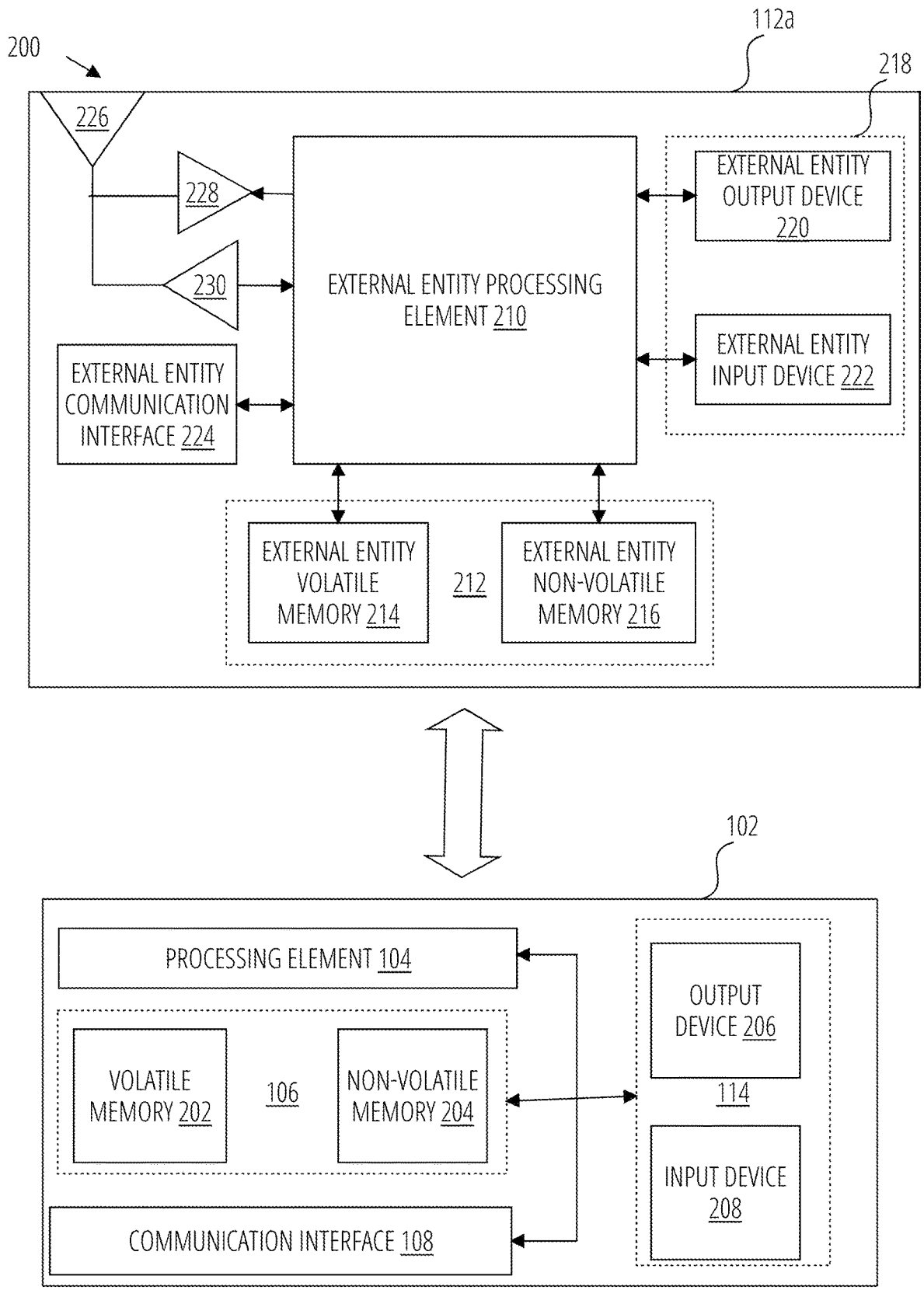
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include one or more external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Examples of Certain Terms

In some embodiments, the term "data-related task" refers to a computing task for performing a function of an enterprise. A data-related task may include any type of computing task for an enterprise that leverages data to generate one or more data-driven insights. A data-related task, for example, may include a prediction task, classification task, evaluation task, and/or the like. By way of example, a data-related task may include a performance evaluation task configured to measure and/or report operational performance metrics to facilitate enterprise decision making.

In some embodiments, the term "natural language description" refers to a data entity that is indicative of a textual description for a data-related task. A natural language description may include a natural language document, phrase, record, and/or any other representation of natural language. A natural language description, for example, may include a textual description that defines one or more indicators of progress toward an intended result. For instance, a natural language description may include a Key Performance Indicator (KPI) that provides a focus for strategic and/or operational improvement of an operational performance metric. By way of example, a KPI may specify "Claims volume specific to cataracts disease codes in 60+ age group for MN State by specific type of Providers" as an indicator predictive of claim processing efficiency.

In some embodiments, the term "data ecosystem" refers to a data entity that is indicative of a plurality of data sources for an enterprise. A data ecosystem may include an inventory of data sources (and/or data elements thereof) that are accessible to an enterprise for performing one or more data-related tasks. A data ecosystem may include a plurality of data sources that may each include a plurality of different and/or overlapping data elements. In some examples, a data ecosystem may be associated with a data catalog that leverages metadata, such as technical metadata, to establish a searchable inventory of all data sources accessible to the enterprise. To be able to utilize the data elements, datasets, and/or the like from multiple data sources within a data ecosystem, without creating multiple copies of such data assets, an enterprise may search a data catalog of a data ecosystem using traditional data management tools. However, traditional catalogs are mostly incomplete, missing key task information, and missing lineage information for different datasets across a myriad of data sources within a data ecosystem. Due to a lack of metadata completeness, traditional catalogs are unable to support informative and searchable inventories of all datasets in an enterprise.

In some embodiments, the term "data source" refers to a data storage entity configured to store, maintain, and/or monitor one or more portions of a data ecosystem. A data source may include a heterogenous data store that is configured to store data using specific database technologies, such as Netezza, Teradata, COSMOS, constant database (CDB), distributed databases (NDB), data lakes, data marts, and/or the like. A data source, for example, may include a data repository, such a database, and/or the like, for persistently storing and managing collections of structured and/or unstructured data (e.g., data elements, metadata, etc.).

Across an enterprise, different users (e.g., data analyst, engineers, scientist, report analyst, etc.) may require access to different datasets spread across the enterprise to perform a data-related task. For example, a user may require access to claims data, member profile data, provider data, and/or the like, which may be available for consumption through a consumption data source, such as a data mart.

In some examples, the data sources of a data ecosystem may include a plurality of data elements that may at least partially overlap. For instance, the data from an originating data source may flow to the consumption data source (e.g., data mart, etc.) through a plurality of intermediary data sources, such as COSMOS, CDB, NDB, and/or like, which, in turn, may receive the data from other data sources. At each data source, the data may be joined across key attributes, such as "member id" in a clinical context, to generate new data elements descriptive of overlapping information.

In some embodiments, the term "attribute" refers to a data entity that is associated with one or more data sources within a data ecosystem. An attribute is associated with a plurality of data elements across the plurality of data sources of the data ecosystem. For example, an attribute may be indicative of a particular unit of information. The particular unit of information may be represented by one or more different data elements in one or more of the plurality of data sources of the data ecosystem. As described herein, some aspects of the present disclosure enable the generation of lineage maps that are indicative of a data lineage of an attribute. The data lineage may be indicative of a plurality of data elements corresponding to the attribute to help understand where data is from, where it's been, and how it is used.

In some embodiments, the term "critical attribute collection" refers to a plurality of attributes that correspond to a data-related task. A critical attribute collection may include a plurality of critical attributes. A critical attribute may include a key field that is used to perform a data-related task. In some examples, a critical attribute collection may be based on a textual description for the data-related task. By way of example, for the textual description "Claims volume specific to cataracts disease codes in 60+ age group for MN State by specific type of Providers," a critical attribute may be one or more attributes from a member profile, demographic attributes, diagnosis code attributes, provider attributes, and/or the like. Each of these attributes may be accessible through a consumption layer of the data ecosystem and/or may be sourced from one or more previous origination layers of the data ecosystem. By way of example, a critical attribute may include a data element from a consumption layer that is sourced from a plurality of preceding layers of data sources in a data ecosystem.

In some embodiments, the term "attribute selection model" refers to a data entity that is indicative of parameters, hyper-parameters, and/or defined operations of a rules-based, statistical, and/or machine learning model (e.g., model including at least one of one or more rule-based layers, one or more layers that depend on trained parameters, coefficients, and/or the like). For instance, an attribute selection model may include one or more rules-based and/or language models that are configured and/or trained to extract one or more critical attributes from a natural language description of a data-related task.

In some examples, a language model may include a machine learning model including one or more supervised, unsupervised, semi-supervised, reinforcement learning models, and/or the like. In some examples, the language model may include multiple models configured to perform one or more different stages of a natural language interpretation process. As one example, the language model may include a natural language processor (NLP) model (e.g., a KPI translation service, etc.) configured to identify one or more underlying data elements from the natural language description. The NLP model, for example, may include any type of NLP including, as examples, support vector machines, Bayesian networks, maximum entropies, conditional random fields, neural networks, and/or the like. By way of example, the language model may include a named entity recognition model, such as a convolutional neural network (e.g., a spaCy model, etc.), and/or the like. The language model may be trained to generate a plurality of semantic similarity scores between one or more data elements and one or more text elements from the natural language description. In some examples, the language model may output a list of data elements that respectively correspond to a list of text elements from the natural language description.

In some examples, a rule-based model may include a plurality of relational rules configured to identify one or more critical attributes based on the list of text elements. The rule-based model, for example, may include a rule-based named entity recognition model (e.g., for SQL, etc.). The rule-based model may be configured to generate a data-related task to data field map based on logic for the data-related task and/or the natural language description.

In some examples, an attribute selection model may include an aggregation model configured to aggregate outputs from a language model and/or rule-based model to generate the critical attribute collection. For instance, an aggregation model may verify the output from the rule-based model with the output from the language model to generate a percentage accuracy in data-related task to field translation. Using the percentage output accuracy, a critical attribute collection is generated. The critical attribute collection may be mapped to data elements within a consumption layer to identify one or more consumption layer data elements that are critical to the performance of a data-related task.

In some embodiments, a data lineage map is a data entity that is indicative of a flow of data across a plurality of data sources of a data ecosystem. The data lineage map may initially include an empty lineage tracking sheet that may be indicative of a plurality of hierarchical data layers within the data ecosystem. The plurality of hierarchical data layers may be indicative of an end-to-end data flow within an enterprise.

In some embodiments, the data lineage map includes a plurality of nodes, which are indicative of the plurality of hierarchical data layers, and a plurality of edges, which are indicative of the relationship between the plurality of hierarchical data layers. The edges, for example, may define relationships between target data sources and source data sources. A target data source, for instance, may include a data source in which a data element is sourced from a source data source. A respective data source, for example, may be a target data source for an edge connecting the respective data source to a data source that sources data for the respective data source. The same respective data source may be a source data source for an edge connecting the respective data source to a data source that sources data from the respective data source.

In some embodiments, the data lineage map is generated using one or more inputs, such as (i) lineage flows indicative of a manual data lineage mapping sheet (e.g., curated by data stewards, etc.) including a manual binary file format based data flow mapping and (ii) technical metadata and/or (iii) data layer schemas for each data source of the data ecosystem. For example, the technical metadata may be received (e.g., through configuration, scripts, etc.) across each of the plurality of data sources. In addition, or alternatively, data layer schemas of each layer in the end-to-end data flow may be listed in a binary file format, such that direct read of the schema may be performed from the underlying layer. In some examples, each of the inputs may be subjected simultaneously to a data lineage engineering model for lineage creation at a database/storage layer. For example, an empty data lineage map may be generated based on the lineage flows, the data flow in the empty data lineage map may be validated based on the data layer schemas, technical metadata, and/or ingested configuration scripts, highlighting corrections required to the empty data lineage map. In some examples, for each of these data assets, metadata read may be performed (e.g., scanning of the tables/fields) to generate technical metadata from one or more data source catalogs. The end-to-end data flow within the data lineage map may be back traced from target to source layers, with each data elements' information, such as source, target, stage number, domain, point of contacts, and/or the like.

In some embodiments, the term "hierarchical data layer" refers to a data entity within a data lineage map. The hierarchical data layer may be indicative of one or more of the plurality of data sources of the data ecosystem. A hierarchical data layer, for example, may include a subset of the plurality of data sources that are associated with a respective stage of an end-to-end data flow. For instance, each of the data sources within a hierarchical data layer may source and/or receive data entities from respective data sources in a subsequent hierarchical data layer and/or preceding hierarchical data layer to the hierarchical data layer.

In some embodiments, the term "originating layer" refers to a hierarchical data layer of the data lineage map. An originating layer may include a subset of data sources that originate data for subsequent hierarchical data layers of the data lineage map. The subset of data sources may be associated with a subsequent hierarchical data layer and may not be associated with a preceding hierarchical data layer.

In some embodiments, the term "consumption layer" refers to a hierarchical data layer of the data lineage map. A consumption layer may include a subset of data sources that provide consumable data for use by a data-related task. The subset of data sources may be associated with a preceding hierarchical data layer and may not be associated with a subsequent hierarchical data layer.

In some embodiments, the term "critical attribute map" refers to a data entity that is indicative of a partially completed lineage mapping of attributes for a data-related task. A critical attribute map may include a data lineage map that is augmented with a plurality of source-target layer relationships between the plurality of hierarchical layers of the data lineage map. For example, the plurality of source-target layer relationships may be indicative of a relationship between data elements in each of the plurality of hierarchical layers to each of the critical attributes of the critical attribute collection. By way of example, a critical attribute map may be indicative of an end-to-end data flow for each critical attribute from the critical attribute collection that may be mapped from a bottom to top layer of the data lineage map.

In some embodiments, the term "source-target layer relationship" refers to a data entity that is indicative of a relationship between two data elements respectively located in data sources of different hierarchical data layers. For example, a source-target layer relationship may be indicative of a mapping between a source data element within a first hierarchical data layer of the plurality of hierarchical data layers and a target data element within a second hierarchical data layer of the plurality of hierarchical data layers. The source-target layer relationship, for example, may indicate that a target data element is based on (e.g., sourced from, etc.) that source data element.

In some embodiments, the term "data element" refers to a data entity within a data source of the data ecosystem. A data element may include a data field that is defined within a respective data source. For example, a data element may include a field name and technical metadata descriptive of a plurality of characteristics for the data element. In some examples, the same attribute may be represented by a plurality of different data elements across the plurality of data sources of the data ecosystem. Each data element may be indicative of an attribute within a respective data source of the data ecosystem.

In some embodiments, each data element is associated with a field name and technical metadata. Technical metadata, for example, may include data characteristics, such as a table name of a table in which the data element is included, a schema, a data type, one or more data values, a field length, transformation details, and/or the like. In some examples, the technical metadata for each of a plurality of data elements within a data source may be scanned through scripts, crawlers, and/or the like.

In some embodiments, the term "source data element" refers to a first data element of a source-target relationship. A source data element may include a data element of a source-target relationship that sources a corresponding target data element in a subsequent hierarchical data layer.

In some embodiments, the term "target data element" refers to a second data element of a source-target relationship. A target data element may include a data element of a source-target relationship that is derived from a corresponding source data element in a preceding hierarchical data layer.

In some embodiments, the term "semantic similarity score" refers to a metric that is indicative of a measure of similarity between a pair of data elements. A semantic similarity score may be generated using one or more machine learning models, as described herein. A semantic similarity score, for example, may be indicative of a semantic similarity between one or more textual characteristics of the pair of data elements. By way of example, the semantic similarity score may be based on a comparison between the respective field names and/or technical metadata of the pair of data elements.

In some embodiments, the term "relationship mapping model" refers to a data entity that is indicative of parameters, hyper-parameters, and/or defined operations of a rules-based, statistical, and/or machine learning model (e.g., model including at least one of one or more rule-based layers, one or more layers that depend on trained parameters, coefficients, and/or the like). For instance, a relationship mapping model may include one or more rules-based and/or language models that are configured and/or trained to generate a source-target relationship between a pair of data elements between two hierarchical data layers of a data lineage map.

In some examples, a language model may include a machine learning model including one or more supervised, unsupervised, semi-supervised, reinforcement learning models, and/or the like. In some examples, the language model may include multiple models configured to perform one or more different stages of a natural language interpretation process. As one example, the language model may include an NLP model configured to identify one or more matching data elements based on technical metadata for a pair of data elements. The NLP model, for example, may include any type of NLP including, as examples, support vector machines, Bayesian networks, maximum entropies, conditional random fields, neural networks, and/or the like. By way of example, the language model may include a named entity recognition model, such as a convolutional neural network (e.g., a spaCy model, etc.), and/or the like. The language model may be trained to generate a plurality of semantic similarity scores between pairs of data elements based on respective field names and/or technical metadata for the pairs of data elements. In some examples, the language model may output a plurality of semantic similarity matches indicative of a plurality of matching data element pairs. The plurality of matching data element pairs, for example, may be indicative of a plurality of initial source-target layer relationships.

In some examples, a rule-based model may include a plurality of relational rules configured to validate one or more of the plurality of matching data element pairs based on source-target transformation data. The rule-based model, for example, may include a rule-based named entity recognition model (e.g., for SQL, etc.). The rule-based model may be configured to validate and/or define source-target layer relationships. For instance, the rule-based model may be configured to generate validation data for the initial source-target relationships based on source-target transformation data indicative of a plurality of queries to a data ecosystem associated with a respective attribute.

In some examples, the relationship mapping model includes a regression model that is configured to perform a regression analysis and/or factor analysis based on the validation data and the initial source-target layer relationships to generate a final validation data for the initial source-target layer relationships.

In some examples, the relationship mapping model includes an aggregation model configured to aggregate outputs from a language model, rule-based model, and/or the regression model to generate the source-target layer relationships. For instance, an aggregation model may validate the relation between fields from target and source data sources through the live data and confirm match probabilities output by the language model, rule-based model, and/or regression model.

In some embodiments, the term "noncritical attribute" refers to an attribute that is associated with a critical attribute. A noncritical attribute, for example, may include a plurality of attributes that are not identified as critical attributes, but are related to one or more critical attributes. By way of example, a noncritical attribute may include a data element within the same data table as a critical attribute at a consumption layer of the data lineage map.

In some embodiments, the term "task attribute map" refers to a data entity that is indicative of a complete lineage mapping of attributes for a data-related task. A task attribute map may include a data lineage map that is augmented with a plurality of source-target layer relationships between the plurality of hierarchical layers of the data lineage map. For example, the plurality of source-target layer relationships may be indicative of a relationship between data elements in each of the plurality of hierarchical layers to each of the critical attributes and/or noncritical attributes identified for the data-related task. By way of example, a task attribute map may be indicative of an end-to-end data flow for each attribute related to a data-related task that may be mapped from a bottom to top layer of the data lineage map.

IV. Overview, Technical Improvements, and Technical Advantages

Embodiments of the present disclosure present machine learning, data tracking, and data generation techniques that improve data lineage comprehension in a complex data ecosystem. To do so, the present disclosure provides iterative, multi-stage data lineage mapping techniques that leverage machine learning and NLP models at each of multiple processing stages to iteratively map data relationships across multiple layers of disparate data sources. The multi-stage data lineage mapping techniques implement NLP models to generate insights tailored to key attributes of a data-related task. These insights are leveraged at subsequent stages of the multi-stage data lineage mapping technique to generate comprehensive data lineage maps for a complex data ecosystem. In this way, the present disclosure provides data lineage mapping techniques that improve upon conventional data cataloging techniques by automating the lineage tracking of a complex dataset, while improving the accuracy, breadth, and completeness of traditional data catalogs.

Some embodiments of the present disclosure leverage an attribute selection model to identify a critical attribute collection for a complex data ecosystem that may be leveraged to tailor data mapping operations to the operations of an enterprise. Unlike traditional data mapping techniques that simultaneously map all attributes of a dataset, some of the techniques of the present disclosure leverage a critical attribute collection as the basis for generating a base lineage for a complex ecosystem. The critical attribute collection enables the generation of accurate base lineages with reliable relationships between data layers of a complex ecosystem that are grounded in robust metadata available for frequency used (e.g., queried, etc.) data elements. These insights may be leveraged to sequentially map other related attributes across data layers. In this way, the critical attribute collection may improve the accuracy of automatically generated data catalogs in a manner that may dynamically adjust based on the usage of the complex data catalog.

Some embodiments of the present disclosure leverage a combination of machine learning and rule-based approaches to backtrack relationships from a consumption layer of a complex data ecosystem to an originating layer of an attribute. For instance, natural language descriptions may be processed by NLP models to identify attributes at a consumption layer of the complex data ecosystem. These attributes may be traced back to an originating layer by iteratively generating a source-target layer relationship between pairs of hierarchical data layers defined by a data lineage map. In this way, a "right-to-left" approach (e.g., consumption to origination) may be employed to track data lineages instead of the typical "left-to-right" approach (e.g., source to consumption layer). This, in turn, improves the completeness of data lineages and tailors data lineages to data that is actually consumed by a data-related task.

Moreover, some of the embodiments of the present disclosure present automated intelligent data matching and mapping processes using multiple machine learning approaches, including language-based and rule-based approaches for SQL de-construction and relation generation. Such techniques may be applied in combination with a critical attribute collection to intelligently deconstruct SQL code centered around key attributes to improve data lineage tracking across different data layers of a complex data ecosystem. In this way, some embodiments of the present disclosure improve upon traditional data management systems by leveraging machine learning techniques to automate mapping and lineage tracking across different stages through reverse critical attribute traversal that significantly reduces the processing resources required for lineage creation. Ultimately, some of the techniques of the present disclosure, may automate and simplify the data cataloging and lineage creation process, which is a traditionally time-consuming and resource intensive activity that is tailored to a particular entity and fails to adapt to changing circumstances. Using the techniques of the present disclosure, a lineage map may be automatically and accurately generated and continuously updated based on changes to a data ecosystem and/or the goals of an enterprise.

Example inventive and technologically advantageous embodiments of the present disclosure include (i) attribute selection models for identifying a critical attribute collection; (ii) relationship mapping models for intelligently generating source-target relationships based on natural language metadata and/or text; (iii) multi-stage data lineage techniques for mapping data elements based on data usage for a particular enterprise; and (iv) iterative mapping techniques for mapping data elements from a target data layer to an origination data layer, among others.

V. Example System Operations

As indicated, various embodiments of the present disclosure make important technical contributions to data lineage tracking techniques. In particular, systems and methods are disclosed herein that implement a multi-stage data lineage mapping technique configured to automatically generate a holistic task attribute map for a complex data ecosystem with multiple hierarchical layers of data sources. The multi-stage data lineage mapping technique provides technical improvements over traditional data lineage tracking techniques by leveraging natural language models to automatically generate the task attribute map over multiple stages specifically designed to sequentially generate and then augment source-target relationships between layers of the complex data ecosystem. In this way, the multi-stage data lineage mapping techniques enable more holistic, comprehensive, and accurate data catalogs at the expense of less computing resources relative to traditional data lineage tracking techniques.

Figure 3:
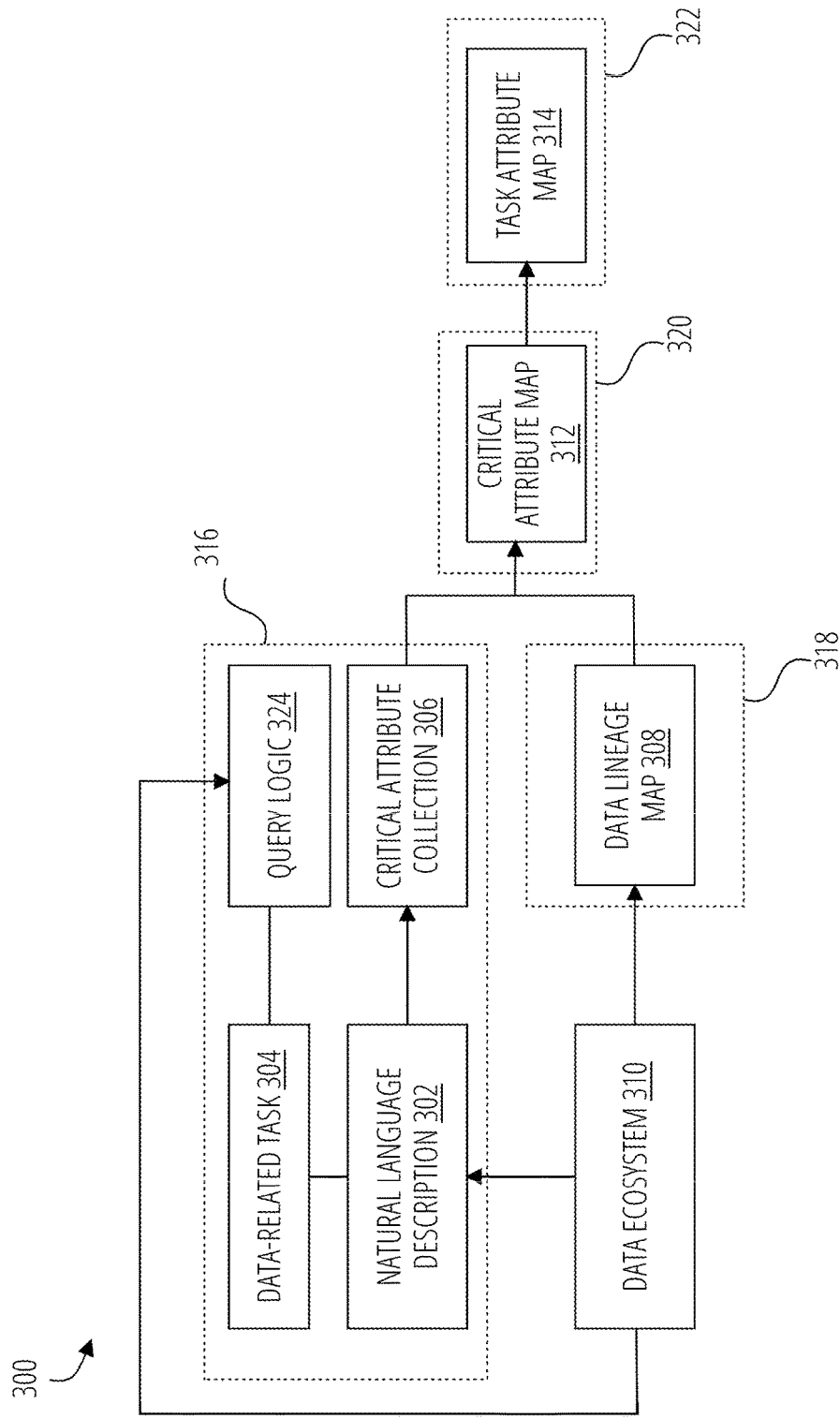
FIG. 3 is a dataflow diagram showing example stages of a multi-stage data lineage mapping technique in accordance with some embodiments discussed herein.

FIG. 3 is a dataflow diagram 300 showing example stages of a multi-stage data lineage mapping technique in accordance with some embodiments discussed herein. The dataflow diagram 300 includes a first stage 316, second stage 318, third stage 320, and a fourth stage 322. During the first stage 316, a natural language description 302 for a data-related task 304 may be translated into a critical attribute collection 306 for a data ecosystem 310. During the second stage 318, a data lineage map 308 may be generated for the data ecosystem 310. The data lineage map 308, for example, may include an empty lineage map. During the third stage 320, a critical attribute map 312 may be generated based on the critical attribute collection 306 and/or the data lineage map 308. For instance, the data lineage map 308 may be backtracked for each critical attribute of the critical attribute collection 306 for data lineage generation. The third stage 320 may also include data validations and relation tracking, as described herein. During the fourth stage 322, a task attribute map 314 may be generated for the data-related task 304 by updating the critical attribute map 312 across all layers for each attribute related to the data-related task 304.

In some embodiments, the multi-stage data lineage mapping technique may first track the lineage from the right (e.g., consumption data sources) to the left (e.g., originating data sources) of a data life cycle. The multi-stage data lineage mapping technique may initially focus on critical attributes for a data-related task to create end-to-end lineage, represented by the critical attribute map 312, that forms the basis of updates to the rest of a holistic, multi-layer data catalog, represented as the task attribute map 314. The multi-stage data lineage mapping technique leverages various machine learning, rule-based, and other models to track the relationships between data elements across hierarchical data layers of a data lineage map 308 by matching their the field names, technical metadata (Schema, data type, field length), performing language-based matching between elements, performing rule-based matching based on SQL transformation logics between different data layers to validate source-target layer relationships, and validating of the outcome from above steps by further matching source-target layer relationships using actual live data through regression and/or factor analysis. Each of the above operations may be recursively followed at each data layer listed in the data lineage map 308. The match will be performed for critical attributes from the critical attribute collection 306 between target and sources of each data layer. These insights may then be leveraged to generate the task attribute map 314 at the fourth stage 322.

In this manner, a holistic, complete, and accurate task attribute map 314 may be automatically generated for a data-related task 304 over a multi-stage data lineage mapping technique. At each stage of the multi-stage data lineage mapping technique, new data may be generated for a data ecosystem that may be leveraged at subsequent stages to iteratively and incrementally generate the task attribute map 314 using machine learning, NLP, and other techniques described herein. For example, the first stage 316 of the multi-stage data lineage mapping technique will now further be described with reference to FIG. 4.

Figure 4:
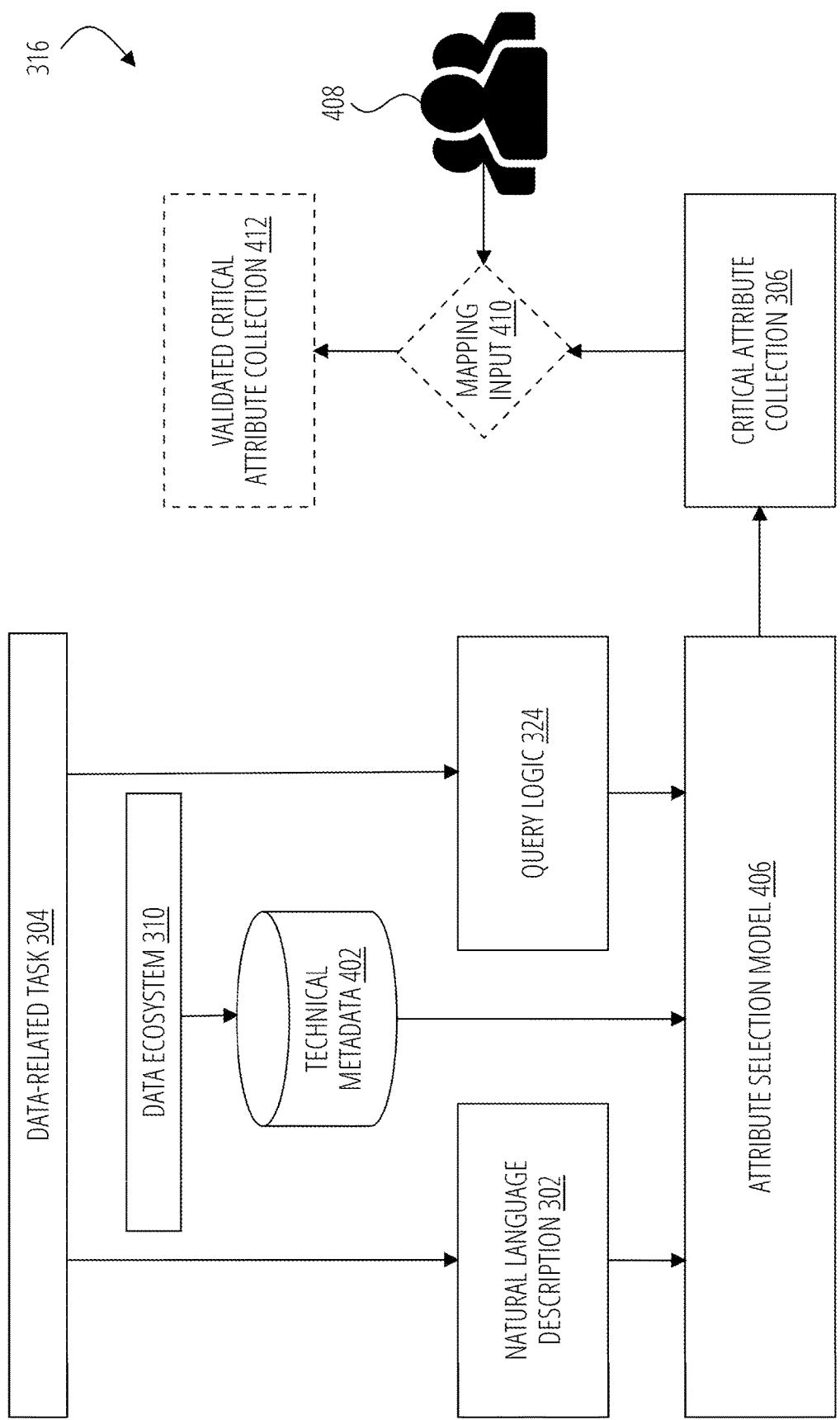
FIG. 4 is a dataflow diagram of a first stage of the multi-stage data lineage mapping technique in accordance with some embodiments discussed herein.

FIG. 4 is a dataflow diagram of a first stage 316 of the multi-stage data lineage mapping technique in accordance with some embodiments discussed herein. The dataflow diagram illustrates a plurality of data and/or computing entities that may collectively (and/or in one or more combinations) be leveraged to generate a critical attribute collection 306 from a data ecosystem 310 for a data-related task 304. For example, the critical attribute collection 306 may be generated by automatically performing natural language description (e.g., KPIs) translation to critical attributes and critical attribute mapping to underlying data storage layers using an attribute selection model 406 and, optionally, performing manual validation using data stewards 408.

In some embodiments, a data-related task 304 is a computing task for performing a function of an enterprise. The data-related task 304 may include any type of computing task for an enterprise that leverages data to generate one or more data-driven insights. The data-related task 304, for example, may include a prediction task, classification task, evaluation task, and/or the like. By way of example, the data-related task 304 may include a performance evaluation task configured to measure and/or report operational performance metrics to facilitate enterprise decision making.

In some embodiments, the critical attribute collection 306 is generated, using an attribute selection model 406, for the data-related task 304 based on one or more natural language descriptions 302 for the data-related task 304. In some examples, the natural language description 302 may include a key performance indicator (KPI) task and/or key result area (KRA) description.

In some embodiments, a natural language description 302 is a data entity that is indicative of a textual description for a data-related task. A natural language description 302 may include a natural language document, phrase, record, and/or any other representation of natural language. A natural language description 302, for example, may include a textual description that defines one or more indicators of progress toward an intended result. For instance, a natural language description 302 may include a KPI and/or KRA that provides a focus for strategic and/or operational improvement of an operational performance metric. By way of example, a KPI may specify "Claims volume specific to cataracts disease codes in 60+ age group for MN State by specific type of Providers" as an indicator predictive of claim processing efficiency.

In some embodiments, the natural language description 302 may include business KPIs/KRAs identified from important reports, dashboard, metrices, and/or the like. KPI logic (e.g., in SQL queries) from business information tools may be leveraged to generate a KPI to attribute map. In some embodiments, derived logic for the KPI/KRA generation from native attributes of the underlying data consumption layer (data mart or micro marts) (e.g., query logic data 404, etc.) and/or schemas for the underlying consumption layer (e.g., technical metadata 402, etc.) may be obtained for the KPIs/KRAs and used as additional inputs for generating the critical attribute collection 306.

In some examples, the critical attribute collection 306 includes a subset of critical attributes from a plurality of attributes accessible from a data ecosystem 310 for the data-related task 304. In some embodiments, the data ecosystem 310 is a data entity that is indicative of a plurality of data sources for an enterprise. The data ecosystem 310 may include an inventory of data sources (and/or data elements thereof) that are accessible to an enterprise for performing one or more data-related tasks 304. The data ecosystem 310 may include a plurality of data sources that may each include a plurality of different and/or overlapping data elements. In some examples, the data ecosystem 310 may be associated with a data catalog that leverages metadata, such as technical metadata, to establish a searchable inventory of all data sources accessible to the enterprise. To be able to utilize the data elements, datasets, and/or the like from multiple data sources within the data ecosystem 310, without creating multiple copies of such data assets, an enterprise may search the data catalog of the data ecosystem 310 using traditional data management tools. However, traditional catalogs are mostly incomplete, missing key task information, and missing lineage information for different datasets across a myriad of data sources within the data ecosystem 310. Due to a lack of metadata completeness, traditional catalogs are unable to support informative and searchable inventories of all datasets in an enterprise.

In some embodiments, a data source is a data storage entity configured to store, maintain, and/or monitor one or more portions of the data ecosystem 310. A data source may include a heterogenous data store that is configured to store data using specific database technologies, such as Netezza, Teradata, COSMOS, constant database (CDB), distributed databases (NDB), data lakes, data marts, and/or the like. A data source, for example, may include a data repository, such as a database, and/or the like, for persistently storing and managing collections of structured and/or unstructured data (e.g., data elements, metadata, etc.).

Across an enterprise, different users (e.g., data analyst, engineers, scientist, report analyst, etc.) may require access to different datasets spread across the enterprise to perform the data-related task 304. For example, in a clinical domain, a user may require access to claims data, member profile data, provider data, and/or the like, which may be available for consumption through a consumption data source, such as a data mart. In some examples, the data sources of the data ecosystem 310 may include a plurality of data elements that may at least partially overlap. For instance, the data from an originating data source may flow to the consumption data source (e.g., data mart, etc.) through a plurality of intermediary data sources, such as COSMOS, CDB, NDB, and/or like, which, in turn, may receive the data from other data sources. At each data source, the data may be joined across key attributes, such as "member id" in a clinical context, to generate new data elements descriptive of overlapping information.

In some embodiments, an attribute is a data entity that is associated with one or more data sources within the data ecosystem 310. An attribute may be associated with a plurality of data elements across the plurality of data sources of the data ecosystem 310. For example, an attribute may be indicative of a particular unit of information. The particular unit of information may be represented by one or more different data elements in one or more of the plurality of data sources of the data ecosystem 310. As described herein, some aspects of the present disclosure enable the generation of lineage maps that are indicative of a data lineage of an attribute. The data lineage may be indicative of a plurality of data elements corresponding to the attribute to help understand where data is from, where it's been, and how it is used.

In some embodiments, the critical attribute collection 306 includes a plurality of attributes that correspond to the data-related task 304. The critical attribute collection 306 may include a plurality of critical attributes. A critical attribute may include a key field that is used to perform the data-related task 304. In some examples, the critical attribute collection 306 may be based on a textual description for the data-related task 304. By way of example, for the textual description "Claims volume specific to cataracts disease codes in 60+ age group for MN State by specific type of Providers," a critical attribute may be one or more attributes from a member profile, demographic attributes, diagnosis code attributes, provider attributes, and/or the like. Each of these attributes may be accessible through a consumption layer of the data ecosystem 310 and/or may be sourced from one or more previous origination layers of the data ecosystem 310. By way of example, a critical attribute may include a data element from a consumption layer that is sourced from a plurality of preceding layers of data sources in the data ecosystem 310.

In some embodiments, the critical attribute collection 306 may be generated, using the attribute selection model 406 based on a plurality of candidate data entities from a key performance indicator task description. The attribute selection model 406, for example, may generate a plurality of semantic similarity scores between the plurality of data entities and a plurality of data attributes from a data ecosystem 310 for the data-related task 304. The attribute selection model 406 may generate the critical attribute collection 306 based on the plurality of semantic similarity scores and the plurality of data attributes from the data ecosystem 310 for the data-related task 304.

In some embodiments, the attribute selection model 406 is a data entity that is indicative of parameters, hyperparameters, and/or defined operations of a rules-based, statistical, and/or machine learning model (e.g., model including at least one of one or more rule-based layers, one or more layers that depend on trained parameters, coefficients, and/or the like). For instance, an attribute selection model 406 may include one or more rules-based and/or language models that are configured and/or trained to extract one or more critical attributes from the natural language description 302 of the data-related task 304.

In some examples, a language model may include a machine learning model including one or more supervised, unsupervised, semi-supervised, reinforcement learning models, and/or the like. In some examples, the language model may include multiple models configured to perform one or more different stages of a natural language interpretation process. As one example, the language model may include an NLP model (e.g., a KPI translation service, etc.) configured to identify one or more underlying data elements from the natural language description 302. The NLP model, for example, may include any type of NLP including, as examples, support vector machines, Bayesian networks, maximum entropies, conditional random fields, neural networks, and/or the like. By way of example, the language model may include a named entity recognition model, such as a convolutional neural network (e.g., a spaCy model, etc.), and/or the like. The language model may be trained to generate a plurality of semantic similarity scores between one or more data elements and one or more text elements from the natural language description 302. In some examples, the language model may output a list of data elements that respectively correspond to a list of text elements from the natural language description 302.

In some examples, a rule-based model may include a plurality of relational rules configured to identify one or more critical attributes based on the list of text elements. The rule-based model, for example, may include a rule-based named entity recognition model (e.g., for SQL, etc.). The rule-based model may be configured to generate a data-related task to data field map based on the query logic 324 for the data-related task 304 and/or the natural language description 302.

In some examples, the attribute selection model 406 may include an aggregation model configured to aggregate outputs from a language model and/or rule-based model to generate the critical attribute collection 306. For instance, the aggregation model may verify the output from the rule-based model with the output from the language model to generate a percentage accuracy in data-related task to field translation. Using the percentage output accuracy, a critical attribute collection is generated. The critical attribute collection may be mapped to data elements within a consumption layer to identify one or more consumption layer data elements that are critical to the performance of a data-related task.

In some examples, the outcome of the attribute selection model 406 (e.g., the critical attribute collection 306) may include pre-validated attributes that may be manually validated (e.g., by one or more data stewards 408, etc.) through a mapping input 410, wherever available, to generate a validated critical attribute collection 412.

The critical attribute collection 306 (and/or validated critical attribute collection 412, etc.) may include a database level mapping of critical attributes for at least one data-related task with one or more of a list of natural language descriptions 302 used by the enterprise, each natural language description 302 mapped against dashboards hosting them, and critical features related to the natural language descriptions 302. In this manner, the first stage 316 of the multi-stage data lineage mapping technique may iteratively generate the critical attribute collection 306 using one or more models of the attribute selection model 406. The outputs of each of the models will now further be described with reference to FIGS. 5A-C.

FIG. 5A is an operational example of a language model output 500 in accordance with some embodiments discussed herein. The language model output 500 includes underlying required data fields 508 corresponding to natural language terms 506 from the natural language description 302 as extracted by the language model 502. The required data fields 508 may be mapped to one or more critical attributes to generate the critical attribute collection 306, which may include the required data fields 508, a corresponding data source, and/or an attribute name.

FIG. 5B is an operational example of a rule-based model 520 output in accordance with some embodiments discussed herein. The rule-based model 520 includes another critical attribute collection 306, which may include the required data fields 508, a corresponding data source, and/or an attribute name for a plurality of critical attributes extracted using the rule-based model 504 based on the query logic 324.

FIG. 5C is an operational example of an aggregation model output 530 in accordance with some embodiments discussed herein. The aggregation model output 530 may include critical attribute collection 306, which may include a natural language description 302, an index for the data-related task, a location (e.g., report, dashboard, etc.) of the natural language description 302, for each critical attribute, a field name, a database name, a schema, a table name, and/or the like.

Figure 6:
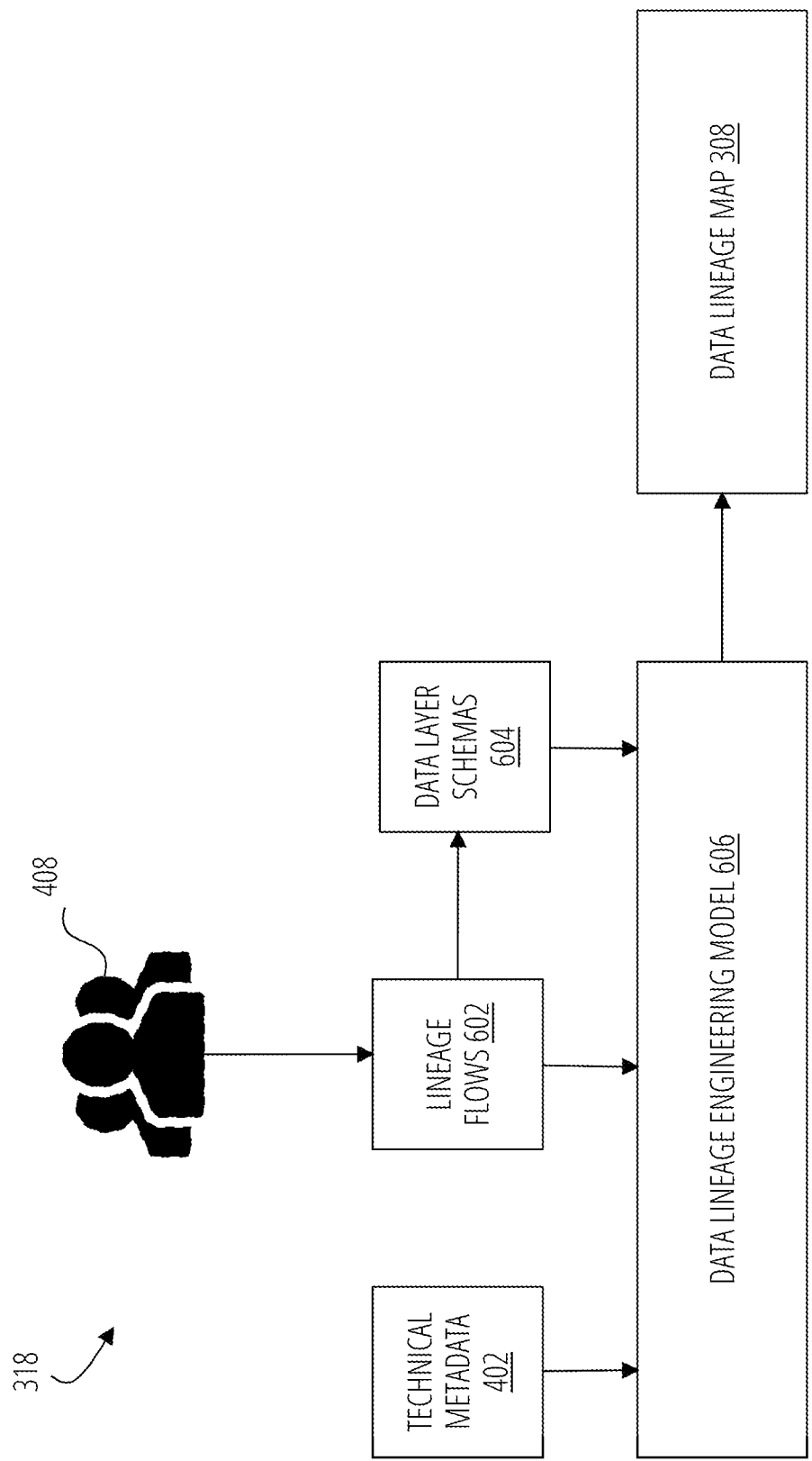
FIG. 6 is a dataflow diagram of a second stage of the multi-stage data lineage mapping technique in accordance with some embodiments discussed herein.

FIG. 6 is a dataflow diagram of a second stage 318 of the multi-stage data lineage mapping technique in accordance with some embodiments discussed herein. The dataflow diagram illustrates a plurality of data and/or computing entities that may collectively (and/or in one or more combinations) be leveraged to generate a data lineage map 308 for a data ecosystem.

In some embodiments, a data lineage map 308 may be received and/or generated that defines a plurality of hierarchical data layers for the data-related task 304. The plurality of hierarchical data layers may include one or more hierarchical data layers between (i) an originating layer including one or more first data sources and/or (ii) a consumption layer including one or more second data sources.

In some embodiments, a data lineage map 308 is a data entity that is indicative of a flow of data across a plurality of data sources of a data ecosystem. The data lineage map 308 may initially include an empty lineage tracking sheet that may be indicative of a plurality of hierarchical data layers within the data ecosystem. The plurality of hierarchical data layers may be indicative of an end-to-end data flow within an enterprise.

In some embodiments, the data lineage map 308 include a plurality of nodes, which are indicative of the plurality of hierarchical data layers, and a plurality of edges, which are indicative of the relationship between the plurality of hierarchical data layers. The edges, for example, may define relationships between target data sources and source data sources. A target data source, for instance, may include a data source in which a data element is sourced from a source data source. A respective data source, for example, may be a target data source for an edge connecting the respective data source to a data source that sources data for the respective data source. The same respective data source may be a source data source for an edge connecting the respective data source to a data source that sources data from the respective data source.

In some embodiments, the data lineage map 308 is generated using one or more inputs, such as (i) lineage flows 602 indicative of a manual data lineage mapping sheet (e.g., curated by data stewards 408, etc.) including a manual binary file format based data flow mapping and (ii) technical metadata 402 and/or (iii) data layer schemas 604 for each data source of the data ecosystem. For example, the technical metadata 402 may be received (e.g., through configuration, scripts, etc.) across each of the plurality of data sources. In addition, or alternatively, data layer schemas 604 of each layer in the end-to-end data flow may be listed in a binary file format, such that direct read of the schema may be performed from the underlying layer. In some examples, each of the inputs may be subjected simultaneously to a data lineage engineering model 606 for lineage creation at a database/storage layer. For example, an empty data lineage map 308 may be generated based on the lineage flows 602, the data flow in the empty data lineage map 308 may be validated based on the data layer schemas 604, technical metadata 402, and/or ingested configuration scripts, highlighting corrections required to the empty data lineage map 308. In some examples, for each of these data assets, metadata read may be performed (e.g., scanning of the tables/fields) to generate technical metadata 402 from one or more data source catalogs. The end-to-end data flow within the data lineage map 308 may be back traced from target to source layers, with each data elements' information, such as source, target, stage number, domain, point of contacts, and/or the like.

In this manner, a complex data ecosystem may be represented using a plurality of defined hierarchical data layers using the data lineage map 308. An operational example of a data lineage map 308 will now further be described with reference to FIG. 7.

Figure 7:
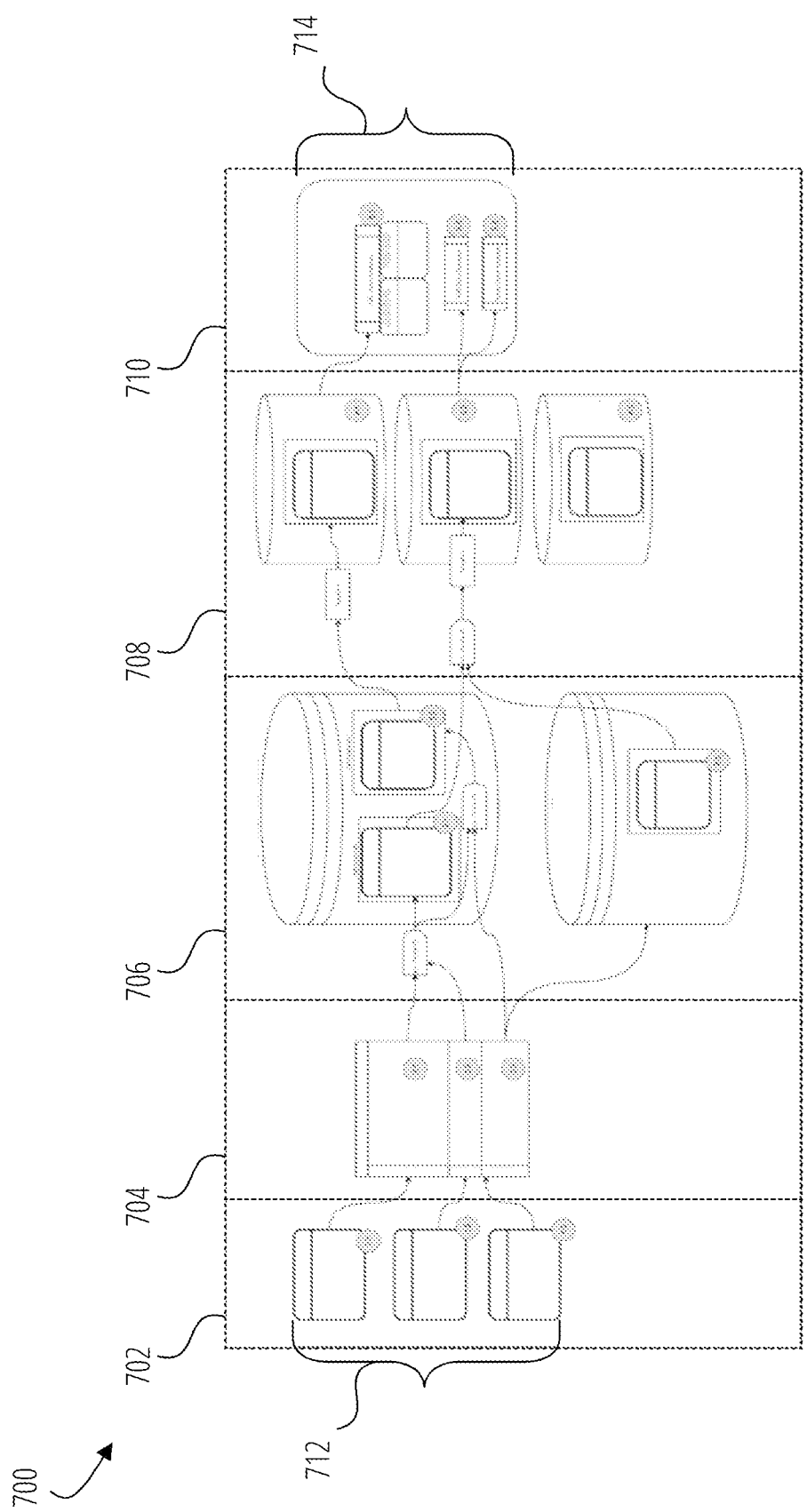
FIG. 7 is an operational example of a data lineage map in accordance with some embodiments discussed herein.

FIG. 7 is an operational example of a data lineage map 308 in accordance with some embodiments discussed herein. The data lineage map 308 may include a plurality of data sources arranged into one or more hierarchical data layers. The hierarchical data layers, for example, may include a first hierarchical data layer 702, a second hierarchical data layer 704, a third hierarchical data layer 706, a fourth hierarchical data layer 708, and/or a fifth hierarchical data layer 710.

In some embodiments, a hierarchical data layer is a data entity within the data lineage map 308. Each hierarchical data layer may be indicative of one or more of the plurality of data sources of the data ecosystem. A hierarchical data layer, for example, may include a subset of the plurality of data sources that are associated with a respective stage of an end-to-end data flow. For instance, each of the data sources within a hierarchical data layer may source and/or receive data entities from respective data sources in a subsequent hierarchical data layer and/or preceding hierarchical data layer to the hierarchical data layer.

The data lineage map 308 may define one or more originating layers (e.g., first hierarchical data layer 702, etc.), one or more consumption layers (e.g., fifth hierarchical data layer 710, etc.), and/or one or more intermediary layers (e.g., second hierarchical data layer 704, third hierarchical data layer 706, fourth hierarchical data layer 708, etc.) between the originating layer and the consumption layer.

In some embodiments, an originating layer is a hierarchical data layer of the data lineage map 308 that includes a subset of data sources (e.g., originating data sources 712, etc.) that originate data for subsequent hierarchical data layers of the data lineage map 308. The originating data sources 712 may be associated with a subsequent hierarchical data layer (e.g., a first hierarchical data layer 702, etc.) and may not be associated with a preceding hierarchical data layer. In some embodiments, a consumption layer is a hierarchical data layer of the data lineage map 308 that includes a subset of data sources (e.g., consumption data sources 714, etc.) that provide consumable data for use by a data-related task. The consumption data sources 714 may be associated with a preceding hierarchical data layer (e.g., a fourth hierarchical data layer 708, etc.) and may not be associated with a subsequent hierarchical data layer.

In some embodiments, the data lineage map 308 is used as a base map for mapping the lineage of a plurality of attributes across each of the plurality of hierarchical data layers of a data ecosystem. To improve upon lineage mapping accuracy, a critical attribute map may be generated for a critical attribute collection, which may serve as an augmented base map for mapping the plurality of attributes. A critical attribute map may be generated during a third stage of a multi-stage data lineage mapping technique, which will now further be described with reference to FIG. 8.

Figure 8:
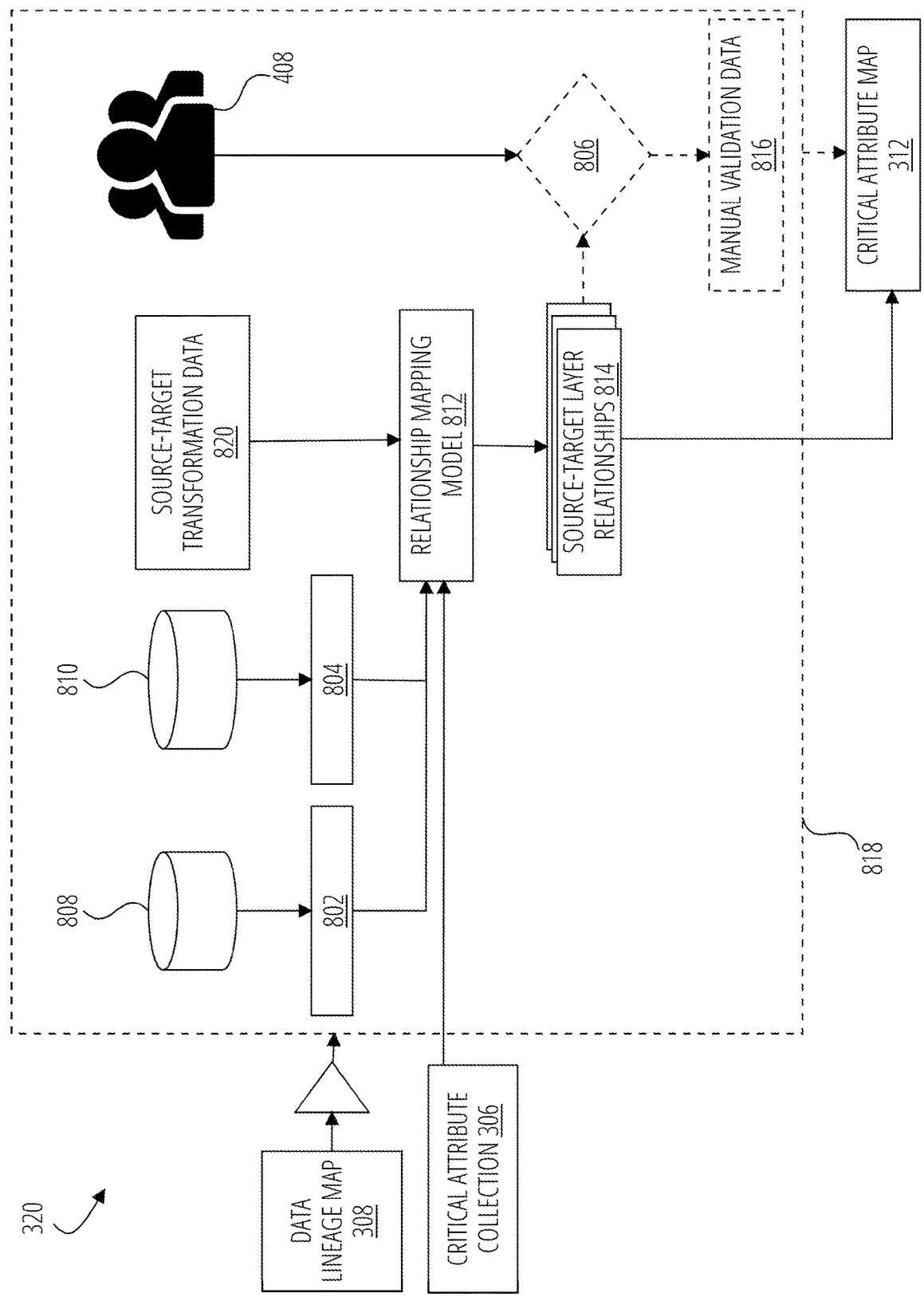
FIG. 8 is a dataflow diagram of a third stage of the multi-stage data lineage mapping technique in accordance with some embodiments discussed herein.

FIG. 8 is a dataflow diagram of a third stage 320 of the multi-stage data lineage mapping technique in accordance with some embodiments discussed herein. The dataflow diagram illustrates a plurality of data and/or computing entities the may collectively (and/or in one or more combinations) be leveraged to generate a critical attribute map 312 from a data ecosystem for a data-related task based on the data lineage map 308 and/or the critical attribute collection 306 output in the first and second stages of the multi-stage data lineage mapping technique.

In some embodiments, the critical attribute map 312 for the data-related task is generated by identifying a data element for a critical attribute from the critical attribute collection 306 at each of the plurality of hierarchical data layers of the data lineage map 308. The critical attribute map 312 may be generated over a plurality of iterations 818. At each iteration 818, a plurality of source-target layer relationships 814 may be generated for the critical attribute collection 306. Each source-target layer relationship may be indicative of a pair of corresponding data elements for a critical attribute of the critical attribute collection 306. The pair of corresponding data elements may be respectively associated with source and target layer analyzed at the iteration 818. For instance, the first data element of a pair of corresponding data elements may be associated with a source layer of the iteration 818 and a second data element of the pair of corresponding data elements may be associated with a target layer of the iteration 818.

At iteration 818 may be performed in a loop for each source layer 808 and target layer 810 listed in the data lineage map 308. Each iteration 818 may leverage the first stage 316 and second stage 318 outputs, including (i) a validated critical attribute collection 412 database level mapping for the originating layer of the data ecosystem and (ii) the data lineage map 308 back traced from target to source layers. For each data layer listed in the data lineage map 308 a plurality of source-target layer relationships 814 may be generated based on complete technical metadata (e.g., source metadata 802 and target metadata 804, etc.), source-target transformation data 820 between two layers, and live data for the critical attribute collection 306. In some examples, each critical attribute of the critical attribute collection 306 may be mapped across each hierarchical data layer of the data lineage map 308 starting with the consumption layer and ending with the originating layer of the data lineage map 308. By way of example, the critical attribute map 312 for the data-related task may be generated by iteratively generating a respective source-target layer relationship for a critical attribute starting with the consumption layer and ending with the originating layer.

In some embodiments, the critical attribute map 312 includes a plurality of source-target layer relationships 814 for a critical attribute of the critical attribute collection 306. In some embodiments, the critical attribute map 312 is a data entity that is indicative of a partially completed lineage mapping of attributes for a data-related task. A critical attribute map 312 may include a data lineage map 308 that is augmented with a plurality of source-target layer relationships 814 between the plurality of hierarchical layers of the data lineage map 308. For example, the plurality of source-target layer relationships 814 may be indicative of a relationship between data elements in each of the plurality of hierarchical layers to each of the critical attributes of the critical attribute collection 306. By way of example, a critical attribute map 312 may be indicative of an end-to-end data flow for each critical attribute from the critical attribute collection 306 that may be mapped from a bottom to top layer of the data lineage map 308.

A source-target layer relationship of the plurality of source-target layer relationships 814 may be indicative of a mapping between a source data element within a first hierarchical data layer (e.g., a source layer 808) of the plurality of hierarchical data layers and a target data element within a second hierarchical data layer (e.g., a target layer 810) of the plurality of hierarchical data layers.

In some embodiments, a source-target layer relationship is a data entity that is indicative of a relationship between two data elements respectively located in data sources of different hierarchical data layers. For example, a source-target layer relationship may be indicative of a mapping between a source data element within a first hierarchical data layer of the plurality of hierarchical data layers and a target data element within a second hierarchical data layer of the plurality of hierarchical data layers. The source-target layer relationship, for example, may indicate that a target data element is based on (e.g., sourced from, etc.) that source data element.

In some embodiments, a data element is a data entity within a data source of the data ecosystem. A data element may include a data field that is defined within a respective data source. For example, a data element may include a field name and technical metadata descriptive of a plurality of characteristics for the data element. In some examples, the same attribute may be represented by a plurality of different data elements across the plurality of data sources of the data ecosystem. Each data element may be indicative of an attribute within a respective data source of the data ecosystem.

In some embodiments, each data element is associated with a field name and technical metadata (e.g., source metadata 802, target metadata 804, etc.). Technical metadata, for example, may include data characteristics, such as a table name of a table in which the data element is included, a schema, a data type, one or more data values, a field length, transformation details, and/or the like. In some examples, the technical metadata for each of a plurality of data elements within a data source may be scanned through scripts, crawlers, and/or the like.

In some embodiments, a source data element is a first data element of a source-target relationship. A source data element may include a data element of a source-target relationship that sources a corresponding target data element in a subsequent hierarchical data layer. The source data element may be associated with the source metadata 802. In some embodiments, the target data element is a second data element of a source-target relationship. A target data element may include a data element of a source-target relationship that is derived from a corresponding source data element in a preceding hierarchical data layer. The target data element may be associated with the target metadata 804.

In some embodiments, a source-target layer relationship is based on a comparison between source metadata 802 corresponding to the source data element and target metadata 804 corresponding to the target data element. For example, source metadata 802 associated with a source layer 808 (e.g., of the iteration 818) and target metadata 804 associated with a target layer 810 (e.g., of the iteration 818) may be received for the source data element and/or the target data element. A similarity match may be generated for the source and target data elements based on the source metadata 802 and target metadata 804.

In some embodiments, the similarity match may be generated using a relationship mapping model 812. For example, a semantic similarity score may be generated, using the relationship mapping model 812, based on the source metadata 802 and the target metadata 804. In some embodiments, a semantic similarity score is a metric that is indicative of a measure of similarity between a pair of data elements. A semantic similarity score may be generated using one or more machine learning models, as described herein. A semantic similarity score, for example, may be indicative of a semantic similarity between one or more textual characteristics of the pair of data elements. By way of example, the semantic similarity score may be based on a comparison between the respective field names and/or technical metadata of the pair of data elements.

In some examples, an initial source-target layer relationship may be generated based on the semantic similarity score. For example, the relationship mapping model 812 may include a language model, such as an NLP named entity recognition model. Using NLP named entity recognition model and the technical metadata mapping, the relationship mapping model 812 may establish an initial source-target layer relationship from the target layer 810 to the source layer 808 based on a semantic similarity match.

In some embodiments, the relationship mapping model 812 is a data entity that is indicative of parameters, hyperparameters, and/or defined operations of a rules-based, statistical, and/or machine learning model (e.g., model including at least one of one or more rule-based layers, one or more layers that depend on trained parameters, coefficients, and/or the like). For instance, the relationship mapping model 812 may include one or more rules-based and/or language models that are configured and/or trained to generate a source-target relationship between a pair of data elements between two hierarchical data layers of the data lineage map 308.

In some examples, a language model may include a machine learning model including one or more supervised, unsupervised, semi-supervised, reinforcement learning models, and/or the like. In some examples, the language model may include multiple models configured to perform one or more different stages of a natural language interpretation process. As one example, the language model may include an NLP model configured to identify one or more matching data elements based on technical metadata for a pair of data elements. The NLP model, for example, may include any type of NLP including, as examples, support vector machines, Bayesian networks, maximum entropies, conditional random fields, neural networks, and/or the like. By way of example, the language model may include a named entity recognition model, such as a convolutional neural network (e.g., a spaCy model, etc.), and/or the like. The language model may be trained to generate a plurality of semantic similarity scores between pairs of data elements based on respective field names and/or technical metadata (e.g., source metadata 802, target metadata 804, etc.) for the pairs of data elements. In some examples, the language model may output a plurality of semantic similarity matches indicative of a plurality of matching data element pairs. The plurality of matching data element pairs, for example, may be indicative of a plurality of initial source-target layer relationships.

In some examples, initial validation data for the initial source-target layer relationship may be generated, using the relationship mapping model 812, based on source-target transformation data 820 between the source layer 808 and target layer 810 (e.g., of the iteration 818). The source-target transformation data 820, for example, may be indicative of a plurality of data queries between the first hierarchical data layer (e.g., source layer 808, etc.) and the second hierarchical data layer (e.g., target layer 810, etc.). For example, the relationship mapping model 812 may include a rule-based model, such as a rule-based named entity recognition model. Using rule-based named entity recognition model and the source-target transformation data 820 (e.g., SQL transformation queries, etc.), the relationship mapping model 812 may validate the initial source-target layer relationships from the target layer 810 to the source layer 808 and define relationships wherever it couldn't be done using the previous layer.

In some examples, the rule-based model may include a plurality of relational rules configured to validate one or more of the plurality of matching data element pairs based on query logic. The rule-based model, for example, may include a rule-based named entity recognition model (e.g., for SQL, etc.). The rule-based model may be configured to validate and/or define source-target layer relationships. For instance, the rule-based model may be configured to generate initial validation data for the initial source-target relationships based on the source-target transformation data 820.

In some embodiments, a source-target layer relationship is generated based on the initial validation data. In addition, or alternatively, final validation data may be generated, using the relationship mapping model 812, for the initial source-target layer relationship based on the initial validation data. The source-target layer relationship may be generated for the initial source-target layer relationship based on the final validation data. By way of example, using the output of the above steps and live data for critical attributes between data layers, a regression analysis/factor analysis may be performed to establish the source-target layer relationship between the source data element and/or the target data element. For example, the relationship mapping model 812 may include a regression model that is configured to perform a regression analysis and/or factor analysis based on the initial validation data and the initial source-target layer relationships to generate final validation data for the initial source-target layer relationships. In some examples, the relationship mapping model 812 may include an aggregation model configured to aggregate outputs from the language model, the rule-based model, and/or the regression model to generate the source-target layer relationships 814. For instance, the aggregation model may validate the relation between fields from target and source data sources through the live data and confirm match probabilities output by the language model, rule-based model, and/or regression model.

In some embodiments, the third stage 320 may leverage manual input 806 from one or more data stewards 408 to generate manual validation data 816 for the source-target layer relationships 814. For instance, the manual validation data 816 may be generated for one or more anomalies, such as mismatches, discrepancies, and/or the like, detected for the source-target layer relationships 814. The data stewards 408, for example, may validate the source-target layer relationships 814 between data elements from target layer 810 and source layer 808 through the live data and confirm the match probabilities.

The above operations may be iteratively performed for each source-target layer to generate the critical attribute map 312, which may represent the end-to-end data flow, mapped from the originating layer to the consumption layer, through source-target layer relationships for each of the critical attributes of the critical attribute collection 306. In this manner, a complex data interrelationship between layers of a data ecosystem may be represented by a critical attribute map 312. An operational example of the critical attribute map 312 will now further be described with reference to FIG. 9.

Figure 9:
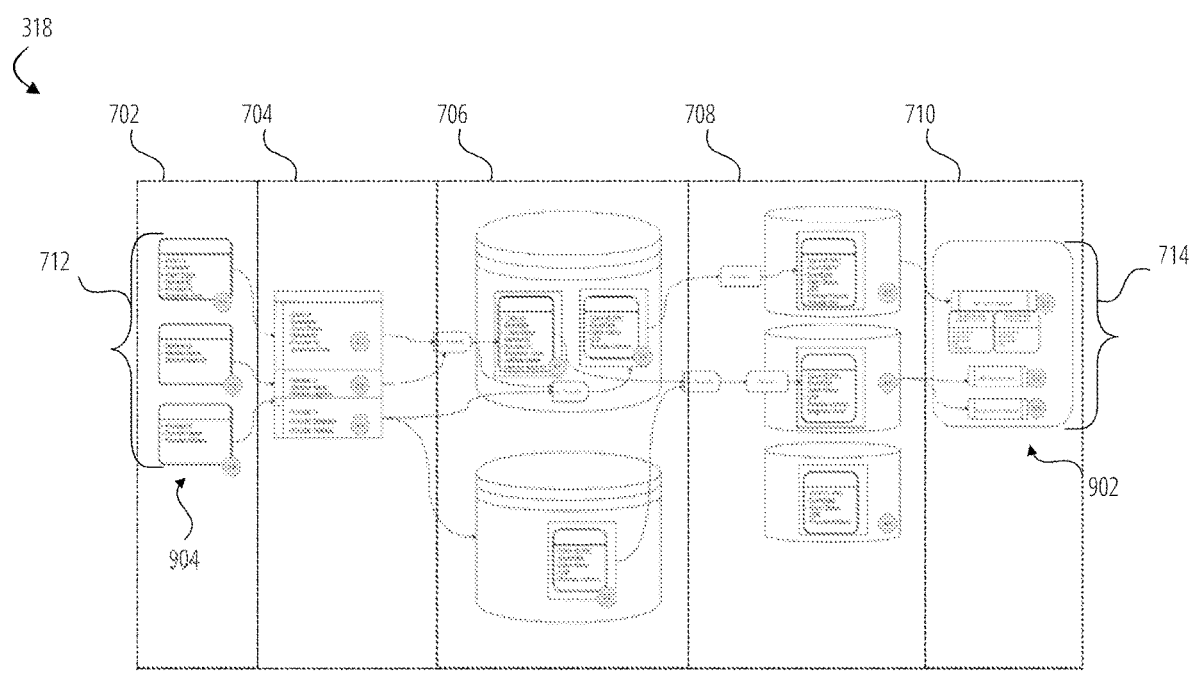
FIG. 9 is an operational example of a critical attribute map in accordance with some embodiments discussed herein.

FIG. 9 is an operational example of a critical attribute map 312 in accordance with some embodiments discussed herein. The critical attribute map 312 may include the plurality of data sources arranged into the one or more hierarchical data layers of the base data lineage map. The hierarchical data layers, for example, may include the first hierarchical data layer 702, the second hierarchical data layer 704, the third hierarchical data layer 706, the fourth hierarchical data layer 708, and/or the fifth hierarchical data layer 710 of the data lineage map. Each layer of the critical attribute map 312 may be augmented with data elements corresponding to a critical attribute of the critical attribute collection and source-target layer relationships linking data elements for the same critical attribute between each hierarchical data layer of the critical attribute map 312. By way of example, the source-target layer relationships may link target data elements 902 within the consumption layer (e.g., fifth hierarchical data layer 710) to source data elements 904 within the originating layer (e.g., first hierarchical data layer 702) backtracking relationships between different data elements at each intermediary layer (e.g., fourth hierarchical data layer 708, third hierarchical data layer 706, second hierarchical data layer 704, etc.) from the consumption layer back to the originating layer.

In some embodiments, the critical attribute map 312 is used as an augmented base map for mapping the lineage of a plurality of attributes across each of the plurality of hierarchical data layers of a data ecosystem. A task attribute map may be generated, using the critical attribute map 312, during a fourth and final stage of a multi-stage data lineage mapping technique, which will now further be described with reference to FIG. 10.

Figure 10:
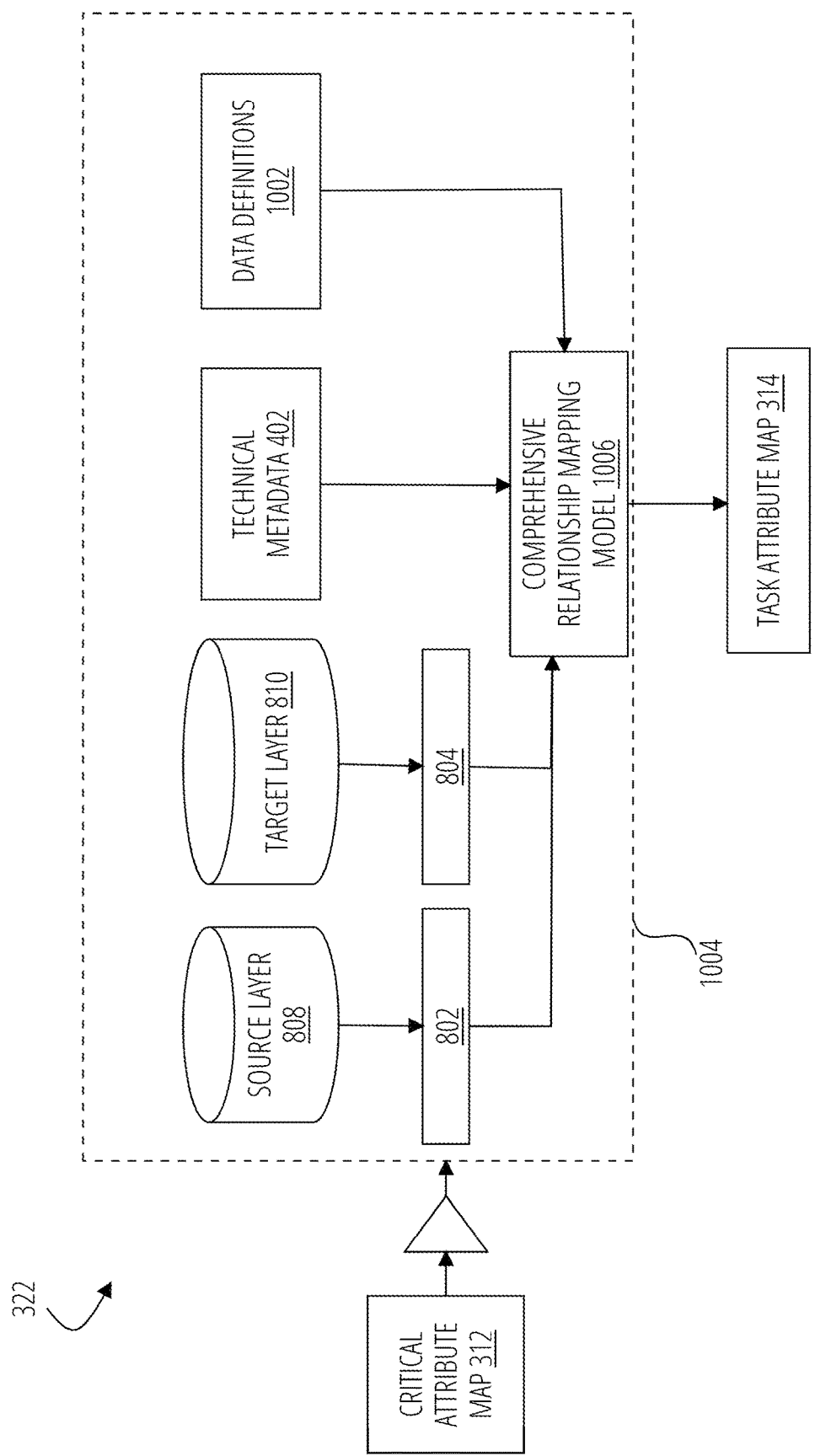
FIG. 10 is a dataflow diagram of a fourth stage of the multi-stage data lineage mapping technique in accordance with some embodiments discussed herein.

FIG. 10 is a dataflow diagram of a fourth stage 322 of the multi-stage data lineage mapping technique in accordance with some embodiments discussed herein. The dataflow diagram illustrates a plurality of data and/or computing entities the may collectively (and/or in one or more combinations) be leveraged to generate a task attribute map 314 from a data ecosystem for a data-related task based on the critical attribute map 312 output in the third stage of the multi-stage data lineage mapping technique.

In some embodiments, the fourth stage 322 expands the metadata mapping of the critical attributes from the third stage to include noncritical attributes associated with the data-related task and/or critical attributes to complete the data mapping process. The metadata update across "All Fields" between hierarchical data layers of the data lineage map may be derived from the source-target layer relationships 814 generated in the third stage. The fourth stage 322 may effectively use similar machine learning based techniques (e.g., comprehensive relationship mapping model 1006, etc.) of the third stage (e.g., relationship mapping model 812, etc.), but applies it for all the attributes involved in the data-related task. By way of example, once the lineage from third stage is available for the end-to-end data flow, the metadata available at each layer (e.g., source metadata 802, target metadata 804, etc.) may be propagated for noncritical attributes across all the layers. Ex-data classification of an attribute ("XYZ") available at an originating source may be propagated to every layer hosting a corresponding data element.

In some embodiments, the plurality of noncritical attributes for the data related task may be identified based on the critical attribute collection. In some embodiments, the noncritical attribute is an attribute that is associated with a critical attribute. A noncritical attribute, for example, may include a plurality of attributes that are not identified as critical attributes, but are related to one or more critical attributes. By way of example, a noncritical attribute may include a data element within the same data table as a critical attribute at a consumption layer of the data lineage map.

In some embodiments, a task attribute map 314 may be generated for the data-related task based on the plurality of noncritical attributes and the critical attribute map 312. In some embodiments, the task attribute map 314 is a data entity that is indicative of a complete lineage mapping of attributes for a data-related task. A task attribute map 314 may include a data lineage map that is augmented with a plurality of source-target layer relationships between the plurality of hierarchical layers of the data lineage map. For example, the plurality of source-target layer relationships may be indicative of a relationship between data elements in each of the plurality of hierarchical layers to each of the critical attributes and/or noncritical attributes identified for the data-related task. By way of example, the task attribute map 314 may be indicative of an end-to-end data flow for each attribute related to a data-related task that may be mapped from a bottom to top layer of the data lineage map.

In some embodiments, the task attribute map 314 for the data-related task is generated by identifying a data element for a noncritical attribute at each of the plurality of hierarchical data layers of the critical attribute map 312. The task attribute map 314 may be generated over a plurality of iterations 1004. At each iteration 1004, source-target layer relationships may be generated for the noncritical attribute. Each source-target layer relationship may be indicative of a pair of corresponding data elements for the noncritical attribute. The pair of corresponding data elements may be respectively associated with source layer 808 and target layer 810 analyzed at the iteration 1004. For instance, the first data element of a pair of corresponding data elements may be associated with a source layer 808 of the iteration 1004 and a second data element of the pair of corresponding data elements may be associated with a target layer 810 of the iteration 1004.

The iterations may be performed in a loop for each source layer 808 and target layer 810 listed in the critical attribute map 312. Each iteration 1004 may leverage the critical attribute map 312 (e.g., end-to-end flow mapped from bottom to top layer, relation defined based on source-target layer relationships between critical attributes of the critical attribute collection, etc.), technical metadata 402 from third party sources (e.g., HCP data products, Collibra, etc.), and/or data definitions 1002. The critical attribute map 312 may be indicative of, for each data layer listed in the data lineage map, complete layer metadata (e.g., source metadata 802, target metadata 804, etc.), data source-target transformation data, and/or live data for all attributes. The data definitions 1002, for example, may include schemas of each layer in end-to-end flow.

At each iteration, each of the inputs are subjected simultaneously to the comprehensive relationship mapping model 1006. The comprehensive relationship mapping model 1006 is configured to map "all the fields" across each source layer 808 and target layer 810, starting with the bottom layer (Data Mart) to its predecessor (Data Warehouse). The comprehensive relationship mapping model 1006 may leverage a language model (e.g., NLP and technical metadata mapping, etc.) to establish source-target layer relationships between all the fields in the target layer 810 to its source layer 808. This may be performed using semantic similarity match as described above. For example, the comprehensive relationship mapping model 1006 may be the same and/or the relationship mapping model 812. The comprehensive relationship mapping model 1006 may leverage a rule-based model (e.g., SQL transformation queries, etc.) to validate and define relationships wherever it couldn't be done using a previous layer. The comprehensive relationship mapping model 1006 may leverage an output of above operations and live data for all the data elements between the data layers to perform regression analysis/factor analysis and establish source-target layer relationships between various data elements from target layer 810 with its source layer 808.

The comprehensive relationship mapping model 1006 may output the task attribute map 314, which may include an end-to-end flow data catalog with information about all the data elements mapped from the bottom to top layer. Details updated against each field may include business definitions (e.g., field description, etc.), data classifications, such as technical metadata details, validation processes to make sure technical metadata, classifications, business definitions are consistent across layers, and/or the like.

Figure 11:
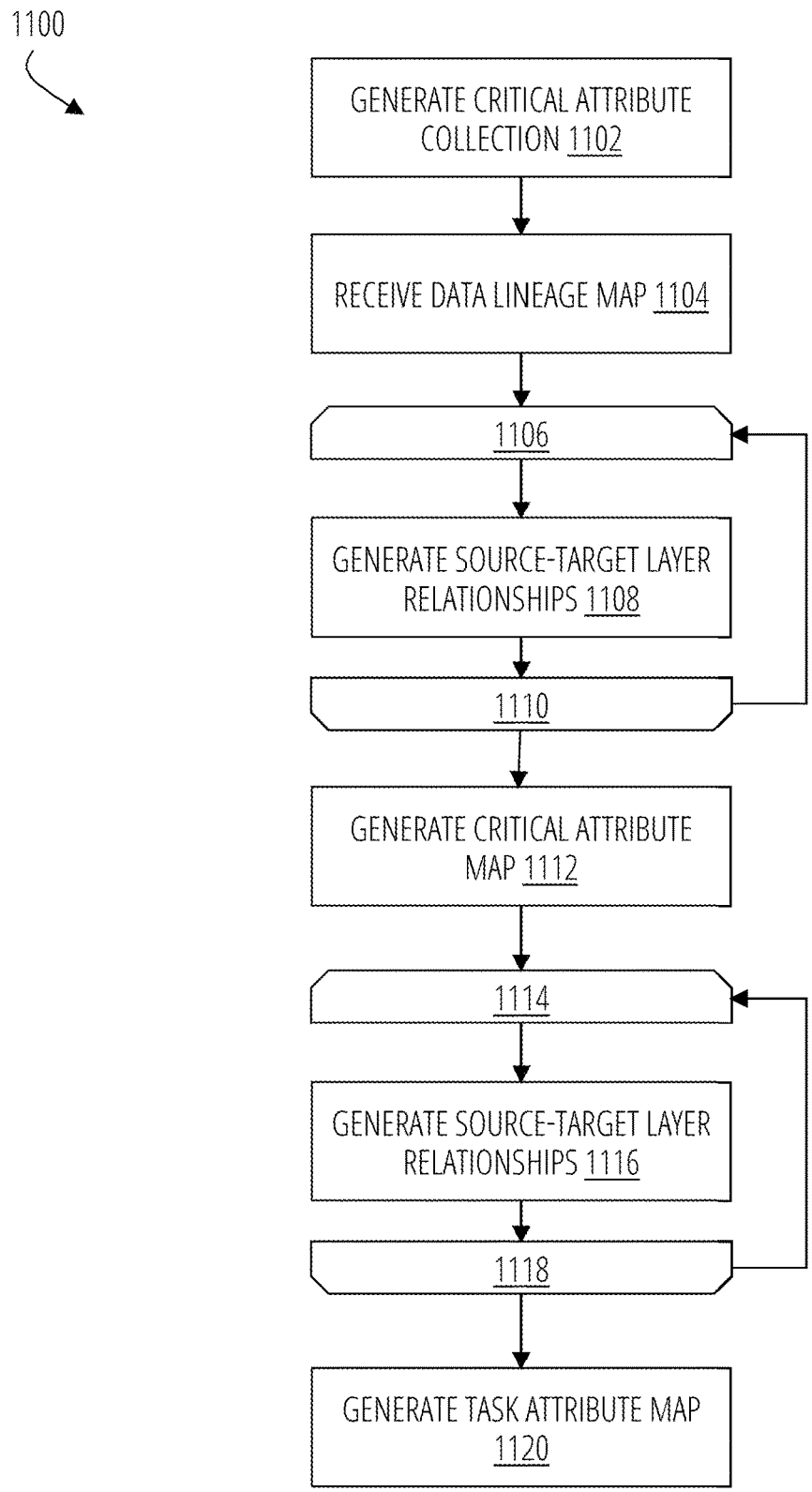
FIG. 11 is a flowchart showing an example of a process for generating a task attribute map in accordance with some embodiments discussed herein

FIG. 11 is a flowchart showing an example of a process 1100 for generating a task attribute map in accordance with some embodiments discussed herein. The flowchart depicts a multi-stage data lineage mapping technique that overcomes various limitations associated with traditional data cataloging techniques. The multi-stage data lineage mapping technique may be implemented by one or more computing devices, entities, and/or systems described herein. For example, via the various steps/operations of the process 1100, the computing system 100 may leverage natural language text and/or technical metadata to automatically identify source-target layer relationships between a plurality of data elements across a plurality data sources to overcome the various limitations with conventional cataloging techniques that are unable to map holistic end-to-end lineages automatically and accurately.

FIG. 11 illustrates an example process 1100 for explanatory purposes. Although the example process 1100 depicts a particular sequence of steps/operations, the sequence may be altered without departing from the scope of the present disclosure. For example, some of the steps/operations depicted may be performed in parallel or in a different sequence that does not materially impact the function of the process 1100. In other examples, different components of an example device or system that implements the process 1100 may perform functions at substantially the same time or in a specific sequence.

In some embodiments, the process 1100 includes, at step/operation 1102, generating a critical attribute collection. For example, the computing system 100 may generate, using an attribute selection model, the critical attribute collection for a data-related task based on one or more natural language descriptions for the data-related task. The critical attribute collection may include a subset of critical attributes from a plurality of attributes accessible from a data ecosystem.

In some examples, a natural language description may include a key performance indicator task description. The computing system 100 may generate, using the attribute selection model, a plurality of candidate data entities from the key performance indicator task description. The computing system 100 may generate, using the attribute selection model, a plurality of semantic similarity scores between the plurality of data entities and a plurality of data attributes from the data ecosystem. The computing system 100 may generate, using the attribute selection model, the critical attribute collection based on the plurality of semantic similarity scores and the plurality of data attributes from the data ecosystem.

In some embodiments, the process 1100 includes, at step/operation 1104, receiving a data lineage map. For example, the computing system 100 may receive a data lineage map that defines a plurality of hierarchical data layers for the data ecosystem associated with the data-related task. The plurality of hierarchical data layers may include one or more hierarchical data layers between (i) an originating layer comprising one or more first data sources and/or (ii) a consumption layer comprising one or more second data sources.

In some embodiments, the process 1100 includes, at step/operation 1106, iteratively generating one or more source-target layer relationships between data elements of a source layer and a target layer of the data lineage map. For example, at step/operation 1106, the computing system 100 may identify a source layer and target layer pair of the data lineage map. The source layer may start with a consumption layer and iteratively move to an intermediate layer directly subsequent to an originating layer of the data lineage map.

In some embodiments, the process 1100 includes, at step/operation 1108, generating one or more source-target layer relationships between the source layer and the target layer pair. For example, the computing system 100 may generate the one or more source-target layer relationships between the source layer and the target layer pair. A source-target layer relationship may be indicative of a mapping between a source data element within a first hierarchical data layer of the plurality of hierarchical data layers and a target data element within a second hierarchical data layer of the plurality of hierarchical data layers.

In some examples, the source-target layer relationship may be based on a comparison between source metadata corresponding to the source data element and target metadata corresponding to the target data element. For example, the computing system 100 may receive the source metadata and the target metadata. The computing system 100 may generate, using a relationship mapping model, a semantic similarity score based on the source metadata and the target metadata. The computing system 100 may generate an initial source-target layer relationship based on the semantic similarity score.

In some examples, the computing system 100 may generate, using the relationship mapping model, initial validation data for the initial source-target layer relationship based on query logic indicative of a plurality of data queries between the first hierarchical data layer and the second hierarchical data layer. The computing system 100 may generate the source-target layer relationship based on the initial validation data.

In some examples, the computing system 100 may generate, using the relationship mapping model, final validation data for the initial source-target layer relationship based on the initial validation data. The computing system 100 may generate the source-target layer relationship based on the final validation data.

In some embodiments, the process 1100 includes, at step/operation 1110, returning to step/operation 1106 until one or more source-target layer relationships are generated for each pair of layers of the data lineage map.

In some embodiments, the process 1100 includes, at step/operation 1112, generating a critical attribute map. For example, the computing system 100 may generate the critical attribute map for the data-related task by identifying a data element for a critical attribute from the critical attribute collection at each of the plurality of hierarchical data layers of the data lineage map. The critical attribute map, for example, may include a plurality of source-target layer relationships for the critical attribute that may be iteratively generated for pairs of source and/or target layers at step/operations 1106 through 1110. In this manner, the computing system 100 may generate the critical attribute map for the data-related task by iteratively generating a respective source-target layer relationship for each critical attribute of the critical attribute collection starting with a consumption layer and ending with an originating layer of each respective critical attribute.

In some embodiments, the process 1100 includes, at step/operation 1114, iteratively generating one or more source-target layer relationships between data elements of a source layer and a target layer of the critical attribute map. For example, at step/operation 1114, the computing system 100 may identify a source layer and target layer pair of the data lineage map. The source layer may start with the consumption layer and iteratively move to an intermediate layer directly subsequent to an originating layer of the data lineage map.

In some embodiments, the process 1100 includes, at step/operation 1116, generating one or more source-target layer relationships between the source layer and the target layer pair. For example, the computing system 100 may identify a plurality of noncritical attributes for the data related task based on the critical attribute collection. The computing system 100 may generate the source-target layer relationships based on the plurality of noncritical attributes using the existing source-target layer relationships of the critical attribute map.

In some embodiments, the process 1100 includes, at step/operation 1118, returning to step/operation 1114 until one or more source-target layer relationships are generated for each pair of layers of the data lineage map.

In some embodiments, the process 1100 includes, at step/operation 1120, generating a task attribute map. For example, the computing system 100 may generate the task attribute map for the data-related task based on the plurality of noncritical attributes and the critical attribute map. The task attribute map, for example, may include the plurality of source-target layer relationships iteratively generated for pairs of source and/or target layers at step/operations 1114 through 1118. In this manner, the process 1100 may enable the generation of task attribute maps that holistically map the end-to-end data lineage of a plurality of attributes within a complex data ecosystem. As described herein, the task attribute map provides a number of technical improvements over traditional data catalogs by improving the accuracy and comprehensiveness of traditional data catalogs at the expense of less computational resources. Moreover, the task attribute map is tailored to the operations of an enterprise and allows for the automation and customization of data catalogs for complex data ecosystems.

Some techniques of the present disclosure enable the generation of action outputs that may be performed to initiate one or more predictive actions to achieve real-world effects. The multi-stage data lineage tracking techniques of the present disclosure may be used, applied, and/or otherwise leveraged to generate a task attribute map, which may help in providing better search results to a complex data ecosystem by prepopulating missing details, and lineage and catalog details. These lineage maps of the present disclosure may be leveraged to initiate the performance of various computing tasks that improve the performance of a computing system (e.g., a computer itself, etc.) with respect to various predictive actions performed by the computing system 100, such as for the resolution of search requests. Example predictive actions may include the generation of predictive search results that illustrate the complete flow of data (e.g., claims data in a clinical search engine, etc.) and data elements hosted across a plurality of different data sources. For instance, the prediction search results may illustrate data elements within multiple different data sources that each correspond to a searched attribute. The lineage maps may be leveraged to generate the prediction search results and present details for each respective data element such that, when selected additional information may be displayed, such as a hosting source, a data owner, a schema, update frequency, and/or the like, that may direct a user to a data element appropriate for a particular use case.

In some examples, the computing tasks may include predictive actions that may be based on a prediction domain. A prediction domain may include any environment in which computing systems may be applied to achieve real-word insights, such as predictions (e.g., search result, source-target layer relationships, etc.), and initiate the performance of computing tasks, such as predictive actions (e.g., search results, etc.), to act on the real-world insights. These predictive actions may cause real-world changes, for example, by controlling a hardware component, providing alerts, interactive search results, and/or the like.

Examples of prediction domains may include financial systems, clinical systems, autonomous systems, robotic systems, and/or the like. Predictive actions in such domains may include the initiation of automated instructions across and between devices, automated notifications, automated scheduling operations, automated precautionary actions, automated security actions, automated data processing actions, automated data compliance actions, automated data access enforcement actions, automated adjustments to computing and/or human data access management, and/or the like.

In some embodiments, the multi-stage data lineage tracking techniques of process 1100 are applied to initiate the performance of one or more predictive actions. A predictive action may depend on the prediction domain. In some examples, the computing system 100 may leverage the multi-stage data lineage tracking techniques to generate data lineage maps that may be leveraged to initiate query processing operations, data governance operations, and/or any other operation for handling single data sources to complex data ecosystems. Moreover, the data indicative of data lineage maps, such as the critical attribute collections, critical attribute maps, task attribute maps, and/or the like, may be displayed as a visual rendering of the aforementioned examples to illustrate end-to-end data lineages of attributes, and/or the like, for improving query operations given constraints of a particular organization and/or complex data ecosystem.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method, the computer-implemented method comprising generating, by one or more processors and using an attribute selection model, a critical attribute collection for a data-related task based on one or more natural language descriptions for the data-related task; receiving, by the one or more processors, a data lineage map that defines a plurality of hierarchical data layers for a data ecosystem associated with the data-related task; generating, by the one or more processors, a critical attribute map for the data-related task by identifying a data element for a critical attribute from the critical attribute collection at each of the plurality of hierarchical data layers of the data lineage map; identifying, by the one or more processors, a plurality of noncritical attributes for the data-related task based on the critical attribute collection; and generating, by the one or more processors, a task attribute map for the data-related task based on the plurality of noncritical attributes and the critical attribute map.

Example 2. A computer-implemented method of example 1, wherein (i) the critical attribute map comprises a plurality of source-target layer relationships for the critical attribute, and (ii) a source-target layer relationship of the plurality of source-target layer relationships is indicative of a mapping between a source data element within a first hierarchical data layer of the plurality of hierarchical data layers and a target data element within a second hierarchical data layer of the plurality of hierarchical data layers.

Example 3. The computer-implemented method of example 2, wherein the source-target layer relationship is based on a comparison between source metadata corresponding to the source data element and target metadata corresponding to the target data element.

Example 4. The computer-implemented method of example 3, wherein generating the source-target layer relationship comprises receiving the source metadata and the target metadata; generating, using a relationship mapping model, a semantic similarity score based on the source metadata and the target metadata; and generating an initial source-target layer relationship based on the semantic similarity score.

Example 5. The computer-implemented method of example 4, wherein generating the source-target layer relationship comprises generating, using the relationship mapping model, initial validation data for the initial source-target layer relationship based on query logic indicative of a plurality of data queries between the first hierarchical data layer and the second hierarchical data layer; and generating the source-target layer relationship based on the initial validation data.

Example 6. The computer-implemented method of example 5, wherein generating the source-target layer relationship comprises generating, using the relationship mapping model, final validation data for the initial source-target layer relationship based on the initial validation data; and generating the source-target layer relationship based on the final validation data.

Example 7. The computer-implemented method of any of the preceding examples, wherein the critical attribute collection comprises a subset of critical attributes from a plurality of attributes accessible from the data ecosystem.

Example 8. The computer-implemented method of any of the preceding examples, wherein the plurality of hierarchical data layers comprises one or more hierarchical data layers between (i) an originating layer comprising one or more first data sources and (ii) a consumption layer comprising one or more second data sources.

Example 9. The computer-implemented method of example 8, wherein generating the critical attribute map for the data-related task comprises iteratively generating a respective source-target layer relationship for the critical attribute starting with the consumption layer and ending with the originating layer.

Example 10. The computer-implemented method of any of the preceding examples, wherein the one or more natural language descriptions comprise a key performance indicator task description, and wherein generating the critical attribute collection comprises generating, using the attribute selection model, a plurality of candidate data entities from the key performance indicator task description; generating, using the attribute selection model, a plurality of semantic similarity scores between the plurality of candidate data entities and a plurality of data attributes from the data ecosystem; and generating, using the attribute selection model, the critical attribute collection based on the plurality of semantic similarity scores and the plurality of data attributes from the data ecosystem.

Example 11. A computing system comprising memory and one or more processors communicatively coupled to the memory, the one or more processors configured to generate, using an attribute selection model, a critical attribute collection for a data-related task based on one or more natural language descriptions for the data-related task; receive a data lineage map that defines a plurality of hierarchical data layers for a data ecosystem associated with the data-related task; generate a critical attribute map for the data-related task by identifying a data element for a critical attribute from the critical attribute collection at each of the plurality of hierarchical data layers of the data lineage map; identify a plurality of noncritical attributes for the data-related task based on the critical attribute collection; and generate a task attribute map for the data-related task based on the plurality of noncritical attributes and the critical attribute map.

Example 12. The computing system of example 11, wherein (i) the critical attribute map comprises a plurality of source-target layer relationships for the critical attribute, and (ii) a source-target layer relationship of the plurality of source-target layer relationships is indicative of a mapping between a source data element within a first hierarchical data layer of the plurality of hierarchical data layers and a target data element within a second hierarchical data layer of the plurality of hierarchical data layers.

Example 13. The computing system of example 12, wherein the source-target layer relationship is based on a comparison between source metadata corresponding to the source data element and target metadata corresponding to the target data element.

Example 14. The computing system of example 13, wherein generating the source-target layer relationship comprises receiving the source metadata and the target metadata; generating, using a relationship mapping model, a semantic similarity score based on the source metadata and the target metadata; and generating an initial source-target layer relationship based on the semantic similarity score.

Example 15. The computing system of example 14, wherein generating the source-target layer relationship comprises generating, using the relationship mapping model, initial validation data for the initial source-target layer relationship based on query logic indicative of a plurality of data queries between the first hierarchical data layer and the second hierarchical data layer; and generating the source-target layer relationship based on the initial validation data.

Example 16. The computing system of example 15, wherein generating the source-target layer relationship comprises generating, using the relationship mapping model, final validation data for the initial source-target layer relationship based on the initial validation data; and generating the source-target layer relationship based on the final validation data.

Example 17. One or more non-transitory computer-readable storage media including instructions that, when executed by one or more processors, cause the one or more processors to generate, using an attribute selection model, a critical attribute collection for a data-related task based on one or more natural language descriptions for the data-related task; receive a data lineage map that defines a plurality of hierarchical data layers for a data ecosystem associated with the data-related task; generate a critical attribute map for the data-related task by identifying a data element for a critical attribute from the critical attribute collection at each of the plurality of hierarchical data layers of the data lineage map; identify a plurality of noncritical attributes for the data-related task based on the critical attribute collection; and generate a task attribute map for the data-related task based on the plurality of noncritical attributes and the critical attribute map.

Example 18. The one or more non-transitory computer-readable storage media of example 17, wherein the critical attribute collection comprises a subset of critical attributes from a plurality of attributes accessible from the data ecosystem.

Example 19. The one or more non-transitory computer-readable storage media of examples 17 or 18, wherein the plurality of hierarchical data layers comprises one or more hierarchical data layers between (i) an originating layer comprising one or more first data sources and (ii) a consumption layer comprising one or more second data sources.

Example 20. The one or more non-transitory computer-readable storage media of example 19, wherein generating the critical attribute map for the data-related task comprises iteratively generating a respective source-target layer relationship for the critical attribute starting with the consumption layer and ending with the originating layer.

The invention claimed is:

1. A computer-implemented method, comprising:
generating, by one or more processors and based on processing one or more natural language descriptions for a data-related task and using an attribute selection model, a critical attribute collection for the data-related task;
receiving, by the one or more processors, a data lineage map that defines a plurality of hierarchical data layers for a data ecosystem associated with the data-related task;
generating, by the one or more processors, a critical attribute map for the data-related task by identifying a data element for a critical attribute from the critical attribute collection at each of the plurality of hierarchical data layers of the data lineage map;
identifying, by the one or more processors, a plurality of noncritical attributes related to the critical attribute collection for the data-related task based on the critical attribute collection;
generating, by the one or more processors, an augmented data entity by augmenting, using the critical attribute map and the plurality of noncritical attributes, a data entity comprising the data lineage map;
generating, by the one or more processors and based on the augmented data entity, a task attribute map for the data-related task that is configured to depict attribute relationships across the plurality of hierarchical data layers; and
responsive to detecting a changed data element corresponding to a particular critical attribute at a hierarchical data layer of the plurality of hierarchical data layers, automatically updating, by the one or more processors and based on the task attribute map for the data-related task, one or more corresponding data elements at one or more additional hierarchical data layers of the plurality of hierarchical data layers.

2. The computer-implemented method of claim 1, wherein:
(i) the critical attribute map comprises a plurality of source-target layer relationships for the particular critical attribute, and
(ii) a source-target layer relationship of the plurality of source-target layer relationships is indicative of a mapping between a source data element within a first hierarchical data layer of the plurality of hierarchical data layers and a target data element within a second hierarchical data layer of the plurality of hierarchical data layers.

3. The computer-implemented method of claim 2, wherein the source-target layer relationship is based on a comparison between source metadata corresponding to the source data element and target metadata corresponding to the target data element.

4. The computer-implemented method of claim 3, further comprising generating the source-target layer relationship, wherein generating the source-target layer relationship comprises:
receiving the source metadata and the target metadata;
generating, using a relationship mapping model, a semantic similarity score based on the source metadata and the target metadata; and
generating an initial source-target layer relationship based on the semantic similarity score.

5. The computer-implemented method of claim 4, wherein generating the source-target layer relationship further comprises:
generating, using the relationship mapping model, initial validation data for the initial source-target layer relationship based on query logic indicative of a plurality of data queries between the first hierarchical data layer and the second hierarchical data layer; and
generating the source-target layer relationship based on the initial validation data.

6. The computer-implemented method of claim 5, wherein generating the source-target layer relationship further comprises:
generating, using the relationship mapping model, final validation data for the initial source-target layer relationship based on the initial validation data; and
generating the source-target layer relationship based on the final validation data.

7. The computer-implemented method of claim 1, wherein the critical attribute collection comprises a subset of critical attributes from a plurality of attributes accessible from the data ecosystem.

8. The computer-implemented method of claim 1, wherein the plurality of hierarchical data layers comprises one or more hierarchical data layers between (i) an originating layer comprising one or more first data sources and (ii) a consumption layer comprising one or more second data sources.

9. The computer-implemented method of claim 8, wherein generating the critical attribute map for the data-related task comprises iteratively generating a respective source-target layer relationship for the critical attribute starting with the consumption layer and ending with the originating layer.

10. The computer-implemented method of claim 1, wherein the one or more natural language descriptions comprise a key performance indicator task description, and wherein generating the critical attribute collection comprises:
generating, using the attribute selection model, a plurality of candidate data entities from the key performance indicator task description;
generating, using the attribute selection model, a plurality of semantic similarity scores between the plurality of candidate data entities and a plurality of data attributes from the data ecosystem; and
generating, using the attribute selection model, the critical attribute collection based on the plurality of semantic similarity scores and the plurality of data attributes from the data ecosystem.

11. A system comprising one or more processors and at least one memory storing processor-executable instructions that, when executed by any one or more of the one or more processors, cause the one or more processors to perform operations comprising:
generating, based on processing one or more natural language descriptions for a data-related task and using an attribute selection model, a critical attribute collection for the data-related task;
receiving a data lineage map that defines a plurality of hierarchical data layers for a data ecosystem associated with the data-related task;

generating a critical attribute map for the data-related task by identifying a data element for a critical attribute from the critical attribute collection at each of the plurality of hierarchical data layers of the data lineage map;

identifying a plurality of noncritical attributes related to the critical attribute collection for the data-related task based on the critical attribute collection;

generating an augmented data entity by augmenting, using the critical attribute map and the plurality of noncritical attributes, a data entity comprising the data lineage map;

generating, based on the augmented data entity, a task attribute map for the data-related task that is configured to depict attribute relationships across the plurality of hierarchical data layers; and responsive to detecting a changed data element corresponding to a particular critical attribute at a hierarchical data layer of the plurality of hierarchical data layers, automatically updating, based on the task attribute map for the data-related task, one or more corresponding data elements at one or more additional hierarchical data layers of the plurality of hierarchical data layers.

12. The system of claim 11, wherein:
(i) the critical attribute map comprises a plurality of source-target layer relationships for the particular critical attribute, and
(ii) a source-target layer relationship of the plurality of source-target layer relationships is indicative of a mapping between a source data element within a first hierarchical data layer of the plurality of hierarchical data layers and a target data element within a second hierarchical data layer of the plurality of hierarchical data layers.

13. The system of claim 12, wherein the source-target layer relationship is based on a comparison between source metadata corresponding to the source data element and target metadata corresponding to the target data element.

14. The system of claim 13, the operations further comprising generating the source-target layer relationship, wherein generating the source-target layer relationship comprises:
receiving the source metadata and the target metadata;
generating, using a relationship mapping model, a semantic similarity score based on the source metadata and the target metadata; and
generating an initial source-target layer relationship based on the semantic similarity score.

15. The system of claim 14, wherein generating the source-target layer relationship further comprises:
generating, using the relationship mapping model, initial validation data for the initial source-target layer relationship based on query logic indicative of a plurality of data queries between the first hierarchical data layer and the second hierarchical data layer; and
generating the source-target layer relationship based on the initial validation data.

16. The system of claim 15, wherein generating the source-target layer relationship further comprises:
generating, using the relationship mapping model, final validation data for the initial source-target layer relationship based on the initial validation data; and
generating the source-target layer relationship based on the final validation data.

17. One or more non-transitory computer-readable storage media storing instructions that, when executed by one or more processors, cause the one or more processors to perform operations comprising:
generating, based on processing one or more natural language descriptions for a data-related task and using an attribute selection model, a critical attribute collection for the data-related task;
receiving a data lineage map that defines a plurality of hierarchical data layers for a data ecosystem associated with the data-related task;
generating a critical attribute map for the data-related task by identifying a data element for a critical attribute from the critical attribute collection at each of the plurality of hierarchical data layers of the data lineage map;
identifying a plurality of noncritical attributes related to the critical attribute collection for the data-related task based on the critical attribute collection;
generating, by the one or more processors, an augmented data entity by augmenting, using the critical attribute map and the plurality of noncritical attributes, a data entity comprising the data lineage map;
generating, based on the augmented data entity, a task attribute map for the data-related task that is configured to depict attribute relationships across the plurality of hierarchical data layers; and
responsive to detecting a changed data element corresponding to a particular critical attribute at a hierarchical data layer of the plurality of hierarchical data layers, automatically updating, based on the task attribute map for the data-related task, one or more corresponding data elements at one or more additional hierarchical data layers of the plurality of hierarchical data layers.

18. The one or more non-transitory computer-readable storage media of claim 17, wherein the critical attribute collection comprises a subset of critical attributes from a plurality of attributes accessible from the data ecosystem.

19. The one or more non-transitory computer-readable storage media of claim 17, wherein the plurality of hierarchical data layers comprises one or more hierarchical data layers between (i) an originating layer comprising one or more first data sources and (ii) a consumption layer comprising one or more second data sources.

20. The one or more non-transitory computer-readable storage media of claim 19, wherein generating the critical attribute map for the data-related task comprises iteratively generating a respective source-target layer relationship for the critical attribute starting with the consumption layer and ending with the originating layer.

* * * * *

UNITED STATES PATENT AND TRADEMARK OFFICE
CERTIFICATE OF CORRECTION

PATENT NO. : 12,287,814 B2
APPLICATION NO. : 18/360932
DATED : April 29, 2025
INVENTOR(S) : Jeetu Asija et al.

Page 1 of 1

It is certified that error appears in the above-identified patent and that said Letters Patent is hereby corrected as shown below:

In the Claims

In Column 39, Line 11, Claim 1, delete "method," and insert -- method --, therefor.

Signed and Sealed this
Twelfth Day of August, 2025

Coke Morgan Stewart
*Acting Director of the United States Patent and Trademark Office*